United States Patent
Onuma et al.

(10) Patent No.: US 10,293,762 B2
(45) Date of Patent: May 21, 2019

(54) VEHICULAR INTERIOR COMPONENT, VEHICULAR INTERIOR PANEL, AND VEHICULAR COMPOSITE INTERIOR COMPONENT

(71) Applicants: TOYODA IRON WORKS CO., LTD., Toyota-shi, Aichi (JP); HAYASHI TELEMPU CORPORATION, Nagoya-shi, Aichi (JP)

(72) Inventors: Kenji Onuma, Toyota (JP); Osamu Miyashita, Toyota (JP); Kenichi Yoshida, Toyota (JP); Masamori Hirose, Toyota (JP); Kenichi Uemori, Nagoya (JP); Shintaro Suga, Nagoya (JP)

(73) Assignees: TOYOTA IRON WORKS CO., LTD., Toyota (JP); HAYASHI TELEMPU CO., LTD, Nagoya (JP)

( * ) Notice: Subject to any disclaimer, the term of this patent is extended or adjusted under 35 U.S.C. 154(b) by 0 days.

(21) Appl. No.: 15/529,710

(22) PCT Filed: Nov. 24, 2015

(86) PCT No.: PCT/JP2015/082960
§ 371 (c)(1),
(2) Date: May 25, 2017

(87) PCT Pub. No.: WO2016/084813
PCT Pub. Date: Jun. 2, 2016

(65) Prior Publication Data
US 2017/0327055 A1 Nov. 16, 2017

(30) Foreign Application Priority Data

Nov. 26, 2014 (JP) .................................. 2014-238706
Dec. 5, 2014 (JP) .................................. 2014-247471
(Continued)

(51) Int. Cl.
*B60R 13/02* (2006.01)
*B60R 21/04* (2006.01)

(52) U.S. Cl.
CPC .......... *B60R 13/02* (2013.01); *B60R 13/0206* (2013.01); *B60R 13/0243* (2013.01); *B60R 21/04* (2013.01)

(58) Field of Classification Search
CPC ........ B60R 13/02; B60R 21/04; B60R 21/045
(Continued)

(56) References Cited

U.S. PATENT DOCUMENTS

| 5,181,759 A | 1/1993 | Doolittle |
| 6,837,544 B2 | 1/2005 | Bomchen et al. |

(Continued)

FOREIGN PATENT DOCUMENTS

| EP | 1712429 A2 | 10/2006 |
| JP | 02-011218 U | 1/1990 |

(Continued)

OTHER PUBLICATIONS

Jan. 19, 2016 International Search Report issued with International Patent Application No. PCT/JP2015/082962.
(Continued)

*Primary Examiner* — Dennis H Pedder
(74) *Attorney, Agent, or Firm* — Oliff PLC

(57) ABSTRACT

A vehicle interior part includes a structure in which a soft upholstery material covers a front surface of a base material which is located on an interior side of a vehicle. The soft upholstery material is disposed in a stretched state on the front surface of the base material which is located on the interior side of the vehicle.

8 Claims, 19 Drawing Sheets

(30) Foreign Application Priority Data

Dec. 5, 2014 (JP) .................. 2014-247472
Jan. 9, 2015 (JP) .................. 2015-003477

(58) Field of Classification Search
USPC ............ 296/146.7, 39.1, 1.08, 1.09; 29/91.1, 29/91.5
See application file for complete search history.

(56) References Cited

U.S. PATENT DOCUMENTS

| | | | |
|---|---|---|---|
| 9,802,383 | B2 | 10/2017 | Miyashita et al. |
| 2004/0217523 | A1* | 11/2004 | Benninger ............ B29C 51/16 264/544 |
| 2006/0220414 | A1 | 10/2006 | Boyer |
| 2007/0108830 | A1 | 5/2007 | Hessler et al. |
| 2007/0278809 | A1 | 12/2007 | Reed et al. |
| 2010/0264680 | A1 | 10/2010 | Ishikawa |
| 2014/0132030 | A1 | 5/2014 | Usami et al. |
| 2015/0048647 | A1 | 2/2015 | Kurosaki et al. |
| 2015/0072105 | A1 | 3/2015 | Miyashita et al. |
| 2015/0290904 | A1 | 10/2015 | Miyashita et al. |
| 2016/0207277 | A1 | 7/2016 | Miyashita et al. |
| 2017/0021779 | A1 | 1/2017 | Yoshida et al. |
| 2017/0122396 | A1 | 5/2017 | Miyashita et al. |

FOREIGN PATENT DOCUMENTS

| | | |
|---|---|---|
| JP | H08-156596 A | 6/1996 |
| JP | 2003-103676 A | 4/2003 |
| JP | 2004-167743 A | 6/2004 |
| JP | 2005-119404 A | 5/2005 |
| JP | 2006-213134 A | 8/2006 |
| JP | 2009-298383 A | 12/2009 |
| JP | 2012-096690 A | 5/2012 |
| JP | 2014-097722 A | 5/2014 |
| JP | 2014-104658 A | 6/2014 |
| JP | 2014-111347 A | 6/2014 |
| JP | 2014-125122 A | 7/2014 |
| JP | 2015-116985 A | 6/2015 |
| JP | 2016-128300 A | 7/2016 |
| WO | 2015/037144 A1 | 3/2015 |
| WO | 2015/151322 A1 | 10/2015 |
| WO | 2015/182403 A1 | 12/2015 |
| WO | 2016/084813 A1 | 6/2016 |
| WO | 2016/088606 A1 | 6/2016 |
| WO | 2016/111094 A1 | 7/2016 |

OTHER PUBLICATIONS

U.S. Appl. No. 15/532,217, filed Jun. 1, 2017 in the name of Hirose et al.
Jan. 19, 2016 Search Report issued in International Patent Application No. PCT/JP2015/082961.
Feb. 23, 2016 Search Report issued in International Patent Application No. PCT/JP2015/082960.
May 3, 2018 Extended European Search Report issued in European Patent Application No. 15864750.3.
Mar. 20, 2018 Office Action issued in Japanese Patent Application No. 2014-247472.
Apr. 23, 2018 Notice of Allowance issued in U.S. Appl. No. 15/532,217.
Feb. 23, 2016 Written Opinion issued in International Patent Application No. PCT/JP2015/082960.
Jan. 19, 2016 Written Opinion issued in International Patent Application No. PCT/JP2015/082962.
Jan. 19, 2016 Written Opinion issued in International Patent Application No. PCT/JP2015/082961.
Nov. 22, 2017 Office Action issued in U.S. Appl. No. 15/532,217.
Nov. 14, 2017 Office Action issued in Japanese Patent Application No. 2014-247472.
Dec. 5, 2017 Office Action issued in Japanese Patent Application No. 2014-247471.
Dec. 5, 2017 Office Action issued in Japanese Patent Application No. 2015-003477.

\* cited by examiner

VEHICULAR INTERIOR COMPONENT, VEHICULAR INTERIOR PANEL, AND VEHICULAR COMPOSITE INTERIOR COMPONENT

TECHNICAL FIELD

The present invention relates to vehicle interior parts, and particularly to an improvement made to facilitate assembly and restrain undesirable tucking-in.

BACKGROUND ART

Vehicle interior parts are known which have a structure in which a projecting rib formed on a terminal portion of a base material is retained in an engagement hole formed in a fold-back terminal portion of a soft upholstery material. One example of such vehicle interior parts is a vehicle arm rest described in FIG. 10 etc. of Patent Document 1.

RELATED ART DOCUMENTS

Patent Documents

Patent Document 1: Japanese Patent Application Publication No. 2006-213134

SUMMARY OF THE INVENTION

Problem to be Solved by the Invention

FIG. 6 is a partial sectional view illustrating a structure for attaching a soft upholstery material 104 to a base material 102 in a vehicle interior part 100 of related art. As shown in FIG. 6, the vehicle interior part 100 has a structure in which a projecting rib 102a formed on a terminal portion of the base material 102 is retained in an engagement. hole 104a formed in a fold-back terminal portion of the soft upholstery material 104. As shown in FIG. 6, the projecting rib 102a has a predetermined thickness dimension and is formed substantially in the middle of the terminal portion of the base material 102 in the thickness direction so as to project from a peripheral edge portion of the terminal portion of the base material 102. The engagement hole 104a is formed in the bent portion of the fold-back terminal portion of the soft upholstery material 104 at a position substantially in the middle of the fold-back terminal portion of the soft upholstery material 104 in the thickness direction.

The related art shown in FIG. 6 is disadvantageous because attachment of the soft upholstery material 104 to the base material 102 is complicated and problems such as undesirable tucking-in tend to occur. That is, when attaching the soft upholstery material 104 to the base material 102, an operation of lifting the soft upholstery material 104 with an operator's finger 106 etc. as shown in FIG. 7 is required, which causes problems such as longer assembly time. Other problems may also occur such as the soft upholstery material 104 failing to go over the projecting rib 102a as shown in FIG. 8, and the projecting rib 102a being caught by the round shape on the back side of the terminal portion of the soft upholstery material 104 as shown in FIG. 9, namely undesirable tucking-in. The inventors discovered these problems while continuing intensive studies with the intention to improve assembly of vehicle interior parts.

The present invention was developed in view of the above circumstances and it is an object of the present invention to provide a vehicle interior part that facilitates assembly and restrains undesirable tucking-in.

Solution to Problem

A first aspect of the invention provides a vehicle interior part including a structure in which a soft upholstery material covers a front surface of a base material which is located on an interior side of a vehicle, characterized in that the soft upholstery material is disposed in a stretched state on the front surface of the base material which is located on the interior side of the vehicle.

A second aspect of the invention provides the vehicle interior part according to the first aspect of the invention, characterized in that the vehicle interior part includes a structure in which a projecting rib formed on a terminal portion of the base material is retained in an engagement hole formed in a fold-back terminal portion of the soft upholstery material, the projecting rib has a tilted surface formed on a design surface side and tilted with respect to a direction in which the projecting rib projects so that the projecting rib becomes gradually thinner toward its tip end in the direction in which the projecting rib projects, and the projecting rib projects from a peripheral edge portion of the terminal portion of the base material at a position closer to an opposite design surface in a thickness direction of the terminal portion.

A third aspect of the invention provides the vehicle interior part according to the second aspect of the invention, characterized in that the engagement hole is formed in a bent portion of the fold-back terminal portion of the soft upholstery material at a position closer to the opposite design surface in a thickness direction of the fold-back terminal portion.

A fourth aspect of the invention provides a vehicle interior panel in which a surface layer member including an upholstery portion and a cushioning portion covers a front surface of a base plate such that the upholstery portion faces an interior side of a vehicle, the vehicle interior panel being the vehicle interior part according to the first aspect of the invention, characterized in that a terminal portion of the base plate includes an inward flange portion projecting toward the interior side of the vehicle, the upholstery portion includes a fold-back terminal portion that is formed by folding back a terminal portion of the upholstery portion toward an exterior side of the vehicle so as to tuck in the terminal portion of the upholstery portion around the terminal portion of the base plate which includes the inward flange portion, and the vehicle interior part has a clearance between a terminal of the inward flange portion and the upholstery portion.

A fifth aspect of the invention provides the vehicle interior panel according to the fourth aspect of the invention, characterized in that the cushioning portion is an elastic projection projecting from the upholstery portion toward the base plate.

A sixth aspect of the invention provides a vehicle composite interior part including a first member and a second member that are fitted on each other, and an elastically deformable soft surface layer member that has an edge portion and that partially or entirely covers a front surface of the first member with the edge portion being held between a mating surface of the first member and a mating surface of the second member, the vehicle composite interior part being the vehicle interior part according to the first aspect of the invention, characterized in that at least one of the soft surface layer member and the second member includes a tensile force generating portion that, as the mating surfaces of the first and second members are moved toward each other, pulls the edge portion of the soft surface layer member toward a back surface of the first member to apply a tensile force to the soft surface layer member.

A seventh aspect of the invention provides the vehicle composite interior part according to the sixth aspect of the invention, characterized in that the tensile force generating portion is a surface layer-side projecting portion that is formed in the edge portion of the soft surface layer member at a position adjacent to the mating surface of the first member on a back surface side of the first member so as to project toward the second member and that is pressed toward the first member by the second member as the edge portion is held between the mating surfaces of the first and second members.

An eighth aspect of the invention provides the vehicle composite interior part according to the sixth aspect of the invention, characterized in that the tensile force generating portion is a second member-side projecting portion that is formed on the second member at a position adjacent to the mating surface of the first member on the back surface side of the first member so as to project from the second member toward the first member and that presses the edge portion of the soft surface layer member toward the first member along the back surface of the first member as the edge portion is held between the mating surfaces of the first and second members.

A ninth aspect of the invention provides the vehicle composite interior part according to the sixth aspect of the invention, characterized in that the tensile force generating portion is a stepped portion that is formed in the second member at a position adjacent to the mating surface of the first member on the back surface side of the first member so as to project from the second member toward the first member and that presses the edge portion of the soft surface layer member toward the first member along the back surface of the first member as the edge portion is held between the mating surfaces of the first and second members.

A tenth aspect of the invention provides the vehicle composite interior part according to the sixth aspect of the invention, characterized in that the tensile force generating portion includes an engagement hole formed in the edge portion of the soft surface layer member at a position adjacent to the mating surface of the first member on the back surface side of the first member so as to extend through the edge portion, an engagement base formed in the second member at a position on the first member side of the mating surface of the first member so as to be located inside the first member, and an engagement projection that projects from the engagement base toward the first member and that engages with the engagement hole and pulls the edge portion of the soft surface layer member toward the back surface of the first member as the edge portion is held between the mating surfaces of the first and second members.

An eleventh aspect of the invention provides the vehicle composite interior part according to the sixth aspect of the invention, characterized in that the tensile force generating portion includes an engagement hole formed in the edge portion of the soft surface layer member at a position corresponding to the mating surface of the first member so as to extend through the edge portion, an engagement projection that projects from the mating surface of the second member toward the first member and that has an engagement tilted surface tilted toward an edge of the soft surface layer member as it extends to a base end of the engagement projection, and a cutout that is formed in the mating surface of the first member and that avoids interference with the engagement projection.

Advantageous Effects of the Invention

The first aspect of the invention provides the vehicle interior part including the structure in which the soft upholstery material covers the front surface of the base material which is located on the interior side of the vehicle, characterized in that the soft upholstery material is disposed in the stretched state on the front surface of the base material which is located on the interior side of the vehicle. Accordingly, there is no slack in the soft upholstery material, and a vehicle interior part with improved design is implemented.

According to the second aspect of the invention, the projecting rib has the tilted surface formed on the design surface side and tilted with respect to the direction in which the projecting rib projects so that the projecting rib becomes gradually thinner toward its tip end in the direction in which the projecting rib projects. The projecting rib projects from the peripheral edge portion of the terminal portion of the base material at a position closer to the opposite design surface in the thickness direction of the terminal portion. Accordingly, by merely bringing the fold-back terminal portion of the soft upholstery material into contact with the projecting rib and pressing the fold-back terminal portion in one direction, the fold-back terminal portion can easily go over the projecting rib. This can facilitate assembly work and can restrain in a preferable manner the projecting rib from being caught by a round shape on the back side of the fold-back terminal portion. That is, the vehicle interior part that facilitates assembly and restrains undesirable tucking-in can be provided.

According to the third aspect of the invention, the engagement hole is formed in the bent portion of the fold-back terminal portion of the soft upholstery material at a position closer to the opposite design surface in the thickness direction of the fold-back terminal portion. This can restrain in a further preferable manner the projecting rib from being caught by a round shape on the back side of the fold-back terminal portion.

According to the fourth aspect of the invention, the terminal portion of the base plate includes the inward flange portion projecting toward the interior side of the vehicle, and the upholstery portion includes the fold-back terminal portion that is formed by folding back the terminal portion of the upholstery portion toward the exterior side of the vehicle so as to tuck in the terminal portion of the upholstery portion around a terminal portion of the base plate which includes the inward flange portion. The vehicle interior part has the clearance between the terminal of the inward flange portion and the upholstery portion. Accordingly, the cushioning portion can be prevented in a preferable manner from being crushed by the fold-back terminal portion of the upholstery portion. This can ensure a soft feel of a terminal portion of a product and can restrain problems such as reduced strength and defective molding due to the difference in thickness. That is, the vehicle interior panel can be provided which achieve an improved feel of a terminal portion of a product while ensuring desired design.

According to the fifth aspect of the invention, the cushioning portion is the elastic projections projecting from the upholstery portion toward the base plate. Accordingly, forming the cushioning portion integrally with the upholstery portion can reduce the material cost and can thus achieve cost reduction.

According to the sixth aspect of the invention, when the mating surfaces of the first and second members to be fitted on each other are moved toward each other to attach the first and second members to each other, the tensile force generating portion included in at least one of the soft surface layer member and the second member pulls the edge portion of the soft surface layer member toward the back surface of the first member to apply a tensile force to the soft surface layer member. The first and second members can thus be easily attached without causing undesirable slack and undesirable coming-off of the soft surface layer member.

According to the seventh aspect of the invention, the tensile force generating portion is the surface layer-side projecting portion that is formed in the edge portion of the soft surface layer member at the position adjacent to the mating surface of the first member on the back surface side of the first member so as to project toward the second member and that is pressed toward the first member by the second member as the edge portion is held between the mating surfaces of the first and second members. Accordingly, when the mating surfaces of the first and second members are moved toward each other to attach the first and second members to each other, the surface layer-side projecting portion projecting from the soft surface layer member toward the second member presses the edge portion of the soft surface layer member toward the back surface of the first member, thereby applying a tensile force to the soft surface layer member. The first and second members can thus be easily attached without causing undesirable slack and undesirable coming-off of the soft surface layer member.

According to the eighth aspect of the invention, the tensile force generating portion is the second member-side projecting portion that is formed on the second member at the position adjacent to the mating surface of the first member on the back surface side of the first member so as to project from the second member toward the first member and that presses the edge portion of the soft surface layer member toward the first member along the back surface of the first member as the edge portion is held between the mating surfaces of the first and second members. Accordingly, when the mating surfaces of the first and second members are moved toward each other to attach the first and second members to each other, the second member-side projecting portion projecting from the second member toward the soft surface layer member presses the edge portion of the soft surface layer member toward the back surface of the first member, thereby applying a tensile force to the soft surface layer member. The first and second members can thus be easily attached to each other without causing undesirable slack and undesirable coming-off of the soft surface layer member.

According to the ninth aspect of the invention, the tensile force generating portion is the stepped portion that is formed in the second member at the position adjacent to the mating surface of the first member on the back surface side of the first member so as to project from the second member toward the first member and that presses the edge portion of the soft surface layer member toward the first member along the back surface of the first member as the edge portion is held between the mating surfaces of the first and second members. Accordingly, when the mating surfaces of the first and second members are moved toward each other to attach the first and second members to each other, the stepped portion formed in the second member presses the edge portion of the soft surface layer member toward the back surface of the first member, thereby applying a tensile force to the soft surface layer member. The first and second members can thus be easily attached to each other without causing undesirable slack and undesirable coming-off of the soft surface layer member.

According to the tenth aspect of the invention, the tensile force generating portion includes the engagement hole formed in the edge portion of the soft surface layer member at the position adjacent to the mating surface of the first member on the back surface side of the first member so as to extend through the edge portion, the engagement base formed in the second member at the position on the first member side of the mating surface of the first member so as to be located inside the first member, and the engagement projection that projects from the engagement base toward the first member and that engages with the engagement hole and pulls the edge portion of the soft surface layer member toward the back surface of the first member as the edge portion is held between the mating surfaces of the first and second members. When the mating surfaces of the first and second members are moved toward each other to attach the first and second members to each other, the edge portion of the soft surface layer member is held between the mating surfaces of the first and second members. In this process, the engagement projection of the second member is engaged with the engagement hole in the soft surface layer member, and the engagement position of the engagement hole is then moved onto the engagement base. As the engagement base is moved toward the first member, the edge portion of the soft surface layer member is pulled toward the back surface of the first member. The first and second members can thus be easily attached to each other without causing undesirable slack and undesirable coming-off of the soft surface layer member.

According to the eleventh aspect of the invention, the tensile force generating portion includes the engagement hole formed in the edge portion of the soft surface layer member at the position corresponding to the mating surface of the first member so as to extend through the edge portion, the engagement projection that projects from the mating surface of the second member toward the first member and that has the engagement tilted surface tilted toward the edge of the soft surface layer member as it extends to the base end of the engagement projection, and the cutout that is formed in the mating surface of the first member and that avoids interference with the engagement projection. When the mating surfaces of the first and second members are moved toward each other to attach the first and second members to each other, the edge portion of the soft surface layer member is held between the mating surfaces of the first and second members. In this process, the engagement projection of the second member is engaged with the engagement hole in the soft surface layer member, and the engagement hole is then moved along the engagement tilted surface of the engagement projection, thereby the edge portion of the soft surface layer member is pulled toward the back surface of the first member. The first and second members can thus be easily attached to each other without causing undesirable slack and undesirable coming-off of the soft surface layer member.

MODES FOR CARRYING OUT THE INVENTION

Preferred embodiments of the present invention will be described in detail below with reference to the accompanying drawings. In the figures used in the following description, each part is not necessarily drawn at an accurate dimensional ratio etc.

First Embodiment

Figure 1:
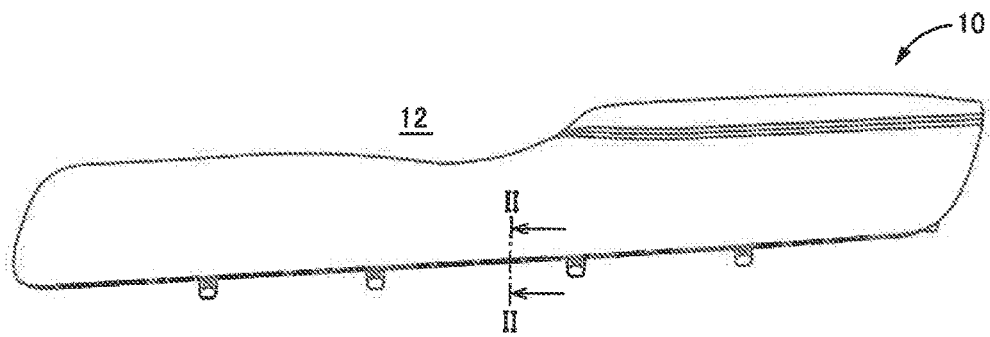
FIG. 1 is a schematic front view showing the configuration of a vehicle interior part according to a preferred embodiment of the present invention.

FIG. 1 is a schematic front view showing the configuration of a vehicle interior part 10 (hereinafter simply referred to as the part 10) according to a preferred embodiment of the present invention, as viewed from the design surface side of the vehicle interior part 10. For example, the part 10 of the present embodiment is a plate-shaped member that is attached to an inner panel of an automobile door, namely to a door inner plate 12, and corresponds to a part of a vehicle door trim that is disposed on the design surface side of the door. In the present embodiment, the design surface refers to the surface of the door inner plate 12 (part 10) etc. which is visible from the interior of the vehicle, and the design surface side corresponds to the interior (passenger compartment) side of the vehicle. The opposite design surface refers to the opposite surface from the design surface, namely the surface that is not visible from the interior of the vehicle, and the opposite design surface side corresponds to the exterior side of the vehicle. The present embodiment is described with respect to an example in which the present invention is applied to a vehicle door trim that is attached to a door inner plate. However, the present invention is also applied in a preferable manner to, e.g., vehicle interior parts such as a luggage side trim, an instrument panel, and an armrest, ornaments that are attached to such interior parts, etc.

Figure 2:
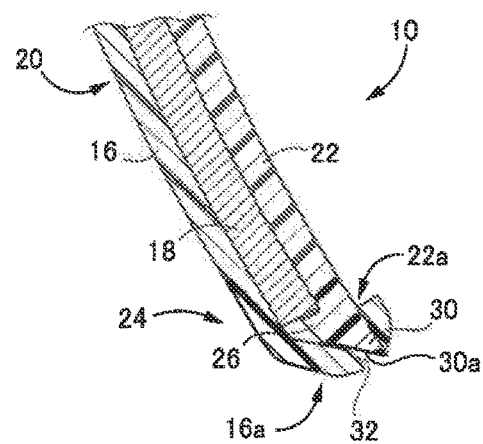
FIG. 2 is a partial sectional view taken along line II-II and viewed in the direction of arrow II-II in FIG. 1.

FIG. 2 is an enlarged partial sectional view taken along line II-II and viewed in the direction of arrow II-II in FIG. 1, showing a region around a terminal portion (terminal portion on the lower side of the vehicle) of the part 10. As shown in FIG. 2, the part 10 includes a soft upholstery material 16, a cushioning material 18, and a base material 22, each formed in the shape of a plate. A surface layer member 20, which is a laminate of the soft upholstery material 16 and the cushioning material 18, is bonded to the front surface (surface on the design surface side) of the base material 22 such that the soft upholstery material 16 faces the interior side (passenger compartment side) of the vehicle. In other words, the surface layer member 20 having the soft upholstery material 16 on the front side (design surface side) and the cushioning material 18 on the back side (opposite design surface side) covers the front surface of the base material 22 such that the soft upholstery material 16 faces the design surface side.

The soft upholstery material 16 is made of a relatively soft (flexible) material that is easily elastically deformed with the force of an operator's finger etc. The soft upholstery material 16 is preferably made of a soft synthetic resin material, and preferred examples of the soft synthetic resin material include various thermoplastic resin materials such as soft polyvinyl chloride, styrene thermoplastic resin materials, olefin thermoplastic resin materials, and polyester thermoplastic resin materials. Alternatively, the soft upholstery material 16 may be made of any of various upholstery materials such as woven or nonwoven fabric, knitted fabric, vinyl chloride, soft films, and natural materials including wool and cowhide. For example, the cushioning material 18 is made of a synthetic resin material such as a polypropylene resin or a urethane resin so as to have predetermined elasticity, namely such cushioning properties that the cushioning material 18 is elastically deformed when pressed. Preferred examples of the synthetic resin material include urethane foam and sponge rubber. The base material 22 is preferably made of a relatively hard synthetic resin material. Preferred examples of the relatively hard synthetic resin material include polypropylene resins, rigid polyvinyl chloride, ABS resins, and AS resins.

The part 10 need not necessarily include the cushioning material 18. For example, multiple elastic projections projecting toward the base material 22 may be formed on the surface on the opposite design surface side of the soft upholstery material 16 so that cushioning properties of the surface layer member 20 are ensured by the elastic projections functioning as a cushioning portion.

As shown in FIG. 2, the part 10 includes a terminal portion structure 24 in which a fold-back terminal portion 16a of the soft upholstery material 16 is tucked in around a terminal portion 22a of the base material 22. The terminal portion of the base material 22 includes an inward flange portion (flange-shaped portion) 26 projecting in the shape of a flange toward the design surface side. In other words, the terminal portion 22a of the base material 22 is bent into the shape of a flange projecting toward the design surface side. The fold-back terminal portion 16a of the soft upholstery material 16 is formed by folding back a terminal portion of the soft upholstery material 16 toward the exterior side of the vehicle (toward the outside of the vehicle, toward the opposite design surface side) so as to tuck in the terminal portion of the soft upholstery material 16 around the terminal portion 22a of the base material 22 which includes the inward flange portion 26. The present embodiment is described with respect to an example in which the terminal portion structure 24 is applied to the terminal portion of the part 10 which is located on the lower side of the vehicle. However, the terminal portion structure 24 of the present embodiment is also applied in a preferable manner to a terminal portion of the part 10 which is located on the upper side of the vehicle, a terminal portion of the part 10 which is located on the lateral side (in the lateral direction) of the vehicle, etc.

Figure 3:
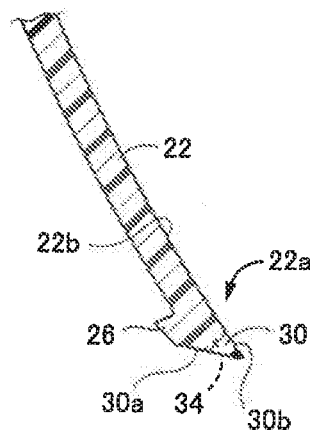
FIG. 3 is a view illustrating in detail the configuration of the terminal portion of the base material in the vehicle interior part of FIG. 2.
Figure 4:
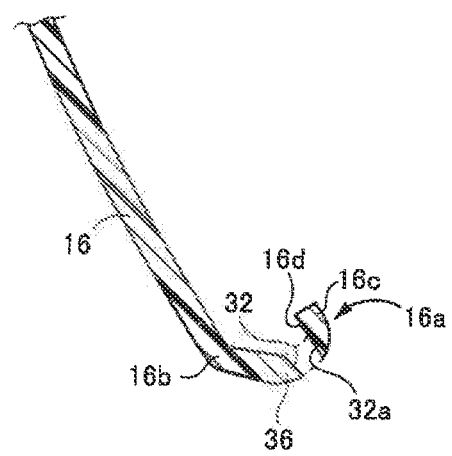
FIG. 4 is a view illustrating in detail the configuration of the fold-back terminal portion of the soft upholstery material in the vehicle interior part of FIG. 2.

FIG. 3 is a view illustrating in detail the configuration of the terminal portion 22a of the base material 22. FIG. 4 is a view illustrating in detail the configuration of the fold-back terminal portion 16a of the soft upholstery material 16. As shown in FIG. 3, the terminal portion 22a of the base material 22 has one or more (preferably more than one; only one is shown in FIGS. 2 and 3) projecting ribs 30 projecting in the plane direction of the base material 22 (the direction in which the base material 22 extends in the vertical direction of the vehicle) from the terminal portion 22a. As shown in FIG. 4, the fold-back terminal portion 16a of the soft upholstery material 16 has one or more (preferably more than one; only one is shown in FIGS. 2 and 4) engagement holes 32 extending through the fold-back terminal portion 16a in the thickness direction of the soft upholstery material 16.

As shown in FIG. 2, the projecting rib 30 and the engagement hole 32 are formed at such positions that correspond to each other when the soft upholstery material 16 is attached to the base material 22. It is preferable that equal numbers of projecting ribs 30 and engagement holes 32 be formed at corresponding positions in a peripheral edge portion of the part 10, e.g., in a portion corresponding to the contour of the part 10 in FIG. 1. Preferably, a plurality of projecting ribs 30 and a plurality of engagement holes 32 are formed at substantially regular intervals in the peripheral direction in the portion corresponding to the contour of the part 10. The projecting ribs 30 formed on the terminal portion 22a of the base material 22 are retained in the engagement holes 32 formed in the fold-back terminal portion 16a of the soft upholstery material 16. The soft upholstery material 16 is thus attached in a stretched state to the base material 22. That is, in the present embodiment, the terminal portion structure 24 corresponds to the structure in which the projecting ribs 30 formed on the terminal portion 22a of the base material 22 are retained in the respective engagement holes 32 formed in the fold-back terminal portion 16a of the soft upholstery material 16.

The projecting rib 30 is formed on a peripheral edge portion 34 of the terminal portion 22a of the base material 22. In the present embodiment, the peripheral edge portion 34 of the terminal portion 22a corresponds to a peripheral edge as the base material 22 is viewed from the design surface side (or the opposite design surface side), and for example, corresponds to the lower end (lower end in the vertical direction of the vehicle) of the terminal portion 22a. In other words, the peripheral edge portion 34 corresponds to the lower end of the terminal portion 22a including the inward flange portion 26. For example, the projecting rib 30 projects in the plane direction of the base material 22 from the peripheral edge portion 34. With the soft upholstery material 16 being attached to the base material 22, the part of the peripheral edge portion 34 on which the projecting rib 30 is not formed contacts the inner side of the fold-back terminal portion 16a of the soft upholstery material 16, namely the inner side of a bent portion 36 described below. The projecting rib 30 projects from the peripheral edge portion 34 at a position relatively closer to the opposite design surface in the thickness direction (on the opposite design surface side with respect to the middle in the thickness direction) of the terminal portion 22a. That is, the projecting rib 30 projects from the peripheral edge portion 34 at a position offset toward the back side, namely toward the opposite side from the design surface side. Preferably, as shown in FIG. 3, a surface portion 30b on the opposite design surface side of the projecting rib 30 is a surface continuous with a surface portion 22b on the opposite design surface side of the base material 22.

The projecting rib 30 becomes gradually thinner toward its tip end in the direction in which the projecting rib 30 projects. Specifically, as shown in FIGS. 2 and 3, the projecting rib 30 includes a tilted surface 30a on the design surface side which is tilted with respect to the direction in which the projecting rib 30 projects. The direction in which the projecting rib 30 projects is the direction in which the projecting rib 30 projects from the peripheral edge portion 34, and in the present embodiment, is the plane direction of the base material 22. That is, the direction in which the projecting rib 30 projects is, e.g., the direction in which the base material 22 extends in the vertical direction of the vehicle. The tilted surface 30a is preferably a flat surface portion, but may be a curved surface portion having a predetermined curvature. In the case where the tilted surface 30a has a curvature, the tilted surface 30a preferably has the center of curvature on the opposite design surface side. As described above, the surface portion 30b on the opposite design surface side of the projecting rib 30 is a surface continuous with the surface portion 22b on the opposite design surface side of the base material 22. Since the tilted surface 30a is formed on the design surface side of the projecting rib 30, the projecting rib 30 becomes gradually thinner toward its tip end in the direction in which the projecting rib 30 projects. That is, the thickness of the projecting rib 30 decreases gradually toward its tip end in the direction in which the projecting rib 30 projects.

The engagement hole 32 is formed in the bent portion 36 of the fold-back terminal portion 16a of the soft upholstery material 16. In the present embodiment, the bent portion 36 of the fold-back terminal portion 16a corresponds to a part that is bent in the fold-back terminal portion 16a. In other words, the bent portion 36 of the fold-back terminal portion 16a corresponds to a part of the fold-back terminal portion 16a which is located between a portion 16b on the design surface side of the fold-back terminal portion 16a and a portion 16c on the opposite design surface side of the fold-back terminal portion 16a. The engagement hole 32 is preferably formed in the bent portion 36 at a position closer to the opposite design surface in the thickness direction (on the opposite design surface side with respect to the middle in the thickness direction) of the fold-back terminal portion 16a. That is, the engagement hole 32 is formed in the bent portion 36 at a position offset toward the back side, namely toward the opposite side from the design surface side. Preferably, as shown in FIG. 4, an inner surface 32a on the opposite design surface side of the engagement hole 32 is a surface continuous with an inner surface 16d of the portion 16c on the opposite design surface side of the fold-back terminal portion 16a. With this configuration, the portion where the engagement hole 32 is formed does not have a round shape on the inner side of the fold-back terminal portion 16a, namely does not have a curved surface shape (e.g., a curved surface with a curvature of a predetermined value or more) between the portion 16c on the opposite design surface side and the bent portion 36.

Figure 5:
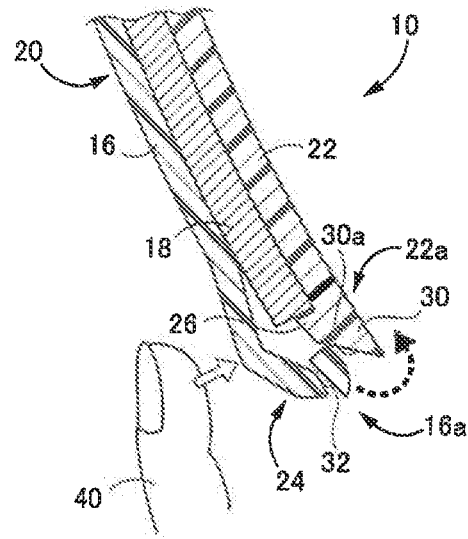
FIG. 5 is a view illustrating that the soft upholstery material can be easily attached to the base material in the vehicle interior part of FIG. 2.
Figure 6:
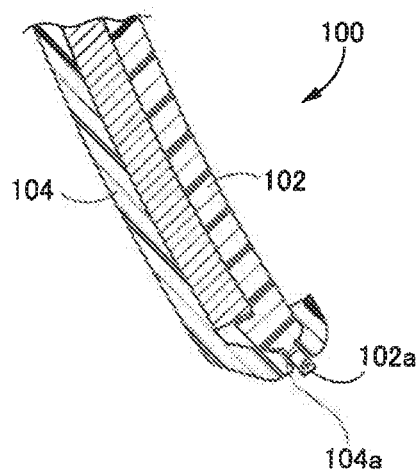
FIG. 6 is a partial sectional view illustrating a structure for attaching a soft upholstery material to a base material in a vehicle interior part of related art, in order to compare the related art with the present invention.
Figure 7:
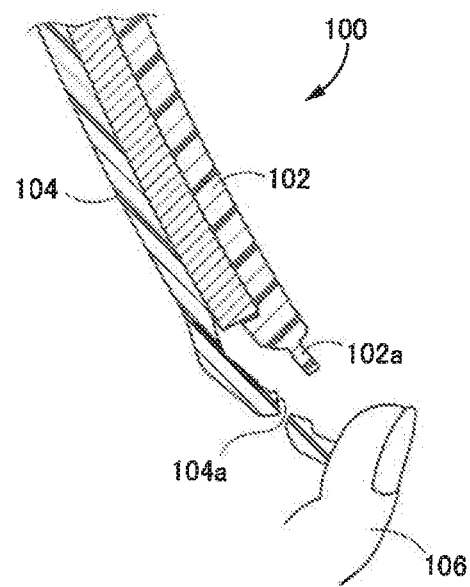
FIG. 7 is a view illustrating that an operation of lifting the soft upholstery material with an operator's finger is required when assembling the conventional vehicle interior part shown in FIG. 6.
Figure 8:
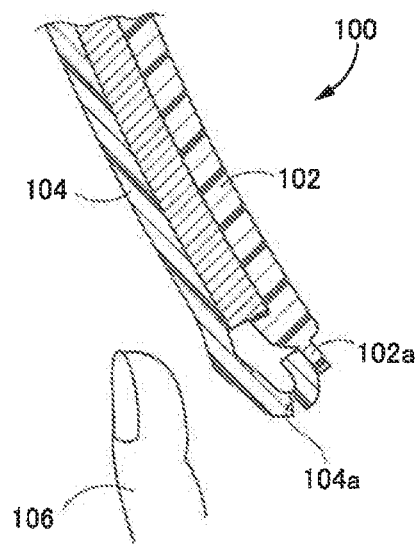
FIG. 8 is a view illustrating that the soft upholstery material may fail to go over a projecting rib of the base material when assembling the conventional vehicle interior part shown in FIG. 6.
Figure 9:
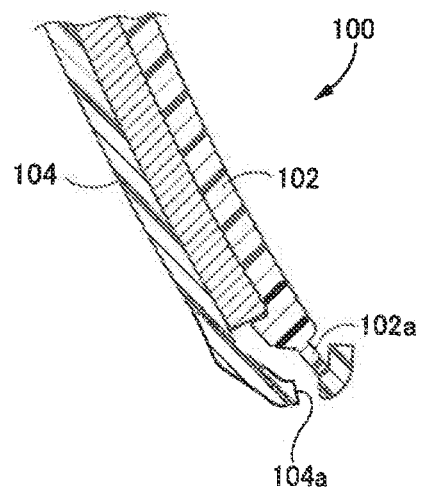
FIG. 9 is a view illustrating that the projecting rib may fail to be caught by the round shape on the back side of the terminal portion of the soft upholstery material, namely undesirable tucking-in may occur when assembling the conventional vehicle interior part shown in FIG. 6.

In the part 10 of the present embodiment configured as described above, the soft upholstery material 16 can be easily attached to the base material 22 by merely bringing the fold-back terminal portion 16a of the soft upholstery material 16 into contact with the projecting rib 30 and pressing the fold-back terminal portion 16a in one direction. That is, as shown in FIG. 5, when an operator who is going to do assembly presses the fold-back terminal portion 16a with his/her finger 40 etc. in the direction shown by a white arrow, the tilted surface 30a of the projecting rib 30 guides the soft upholstery material 16 (fold-back terminal portion 16a) and the fold-back terminal portion 16a thus easily goes over the projecting rib 30 as shown by a dashed arrow. This eliminates the need for an operation of lifting the soft upholstery material 16 with the operator's finger 40 etc., which can reduce assembly time. Moreover, since the engagement hole 32 does not have a round shape on the inner side of the fold-back terminal portion 16a, undesirable tucking-in resulting from the projecting rib 30 being caught by the round shape can be restrained in a preferable manner.

According to the present embodiment, the projecting rib 30 has the tilted surface 30a formed on the design surface side and tilted with respect to the direction in which the projecting rib 30 projects so that the projecting rib 30 becomes gradually thinner toward its tip end in the direction in which the projecting rib 30 projects. The projecting rib 30 projects from the peripheral edge portion 34 of the terminal portion 22a of the base material 22 at a position closer to the opposite design surface in the thickness direction of the terminal portion 22a. Accordingly, by merely bringing the fold-back terminal portion 16a of the soft upholstery material 16 into contact with the projecting rib 30 and pressing the fold-back terminal portion 16a in one direction, the fold-back terminal portion 16a can easily go over the projecting rib 30. This can facilitate assembly work and can restrain in a preferable manner the projecting rib 30 from being caught by a round shape on the back side of the fold-back terminal portion 16a. That is, the part 10 that facilitates assembly and restrains undesirable tucking-in can be provided.

The engagement hole 32 is formed in the bent portion 36 of the fold-back terminal portion 16a of the soft upholstery material 16 at a position closer to the opposite design surface in the thickness direction of the fold-back terminal portion 16a. This can restrain in a further preferable manner the projecting rib 30 from being caught by a round shape on the back side of the fold-back terminal portion 16a.

Another embodiment of the present invention will be described below.

Second Embodiment

Figure 10:
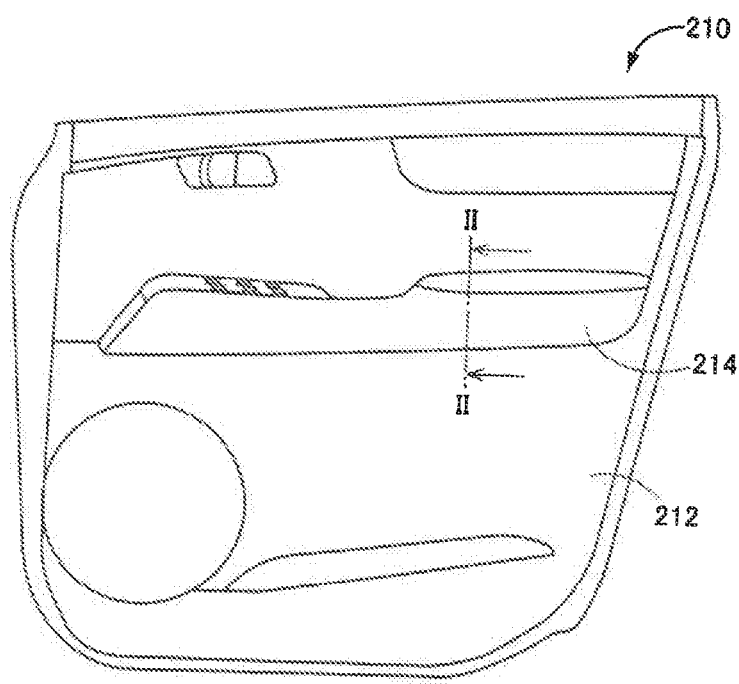
FIG. 10 is a schematic view showing the configuration of a vehicle door including a vehicle interior panel according to another embodiment, namely a second embodiment of the present invention.
Figure 11:
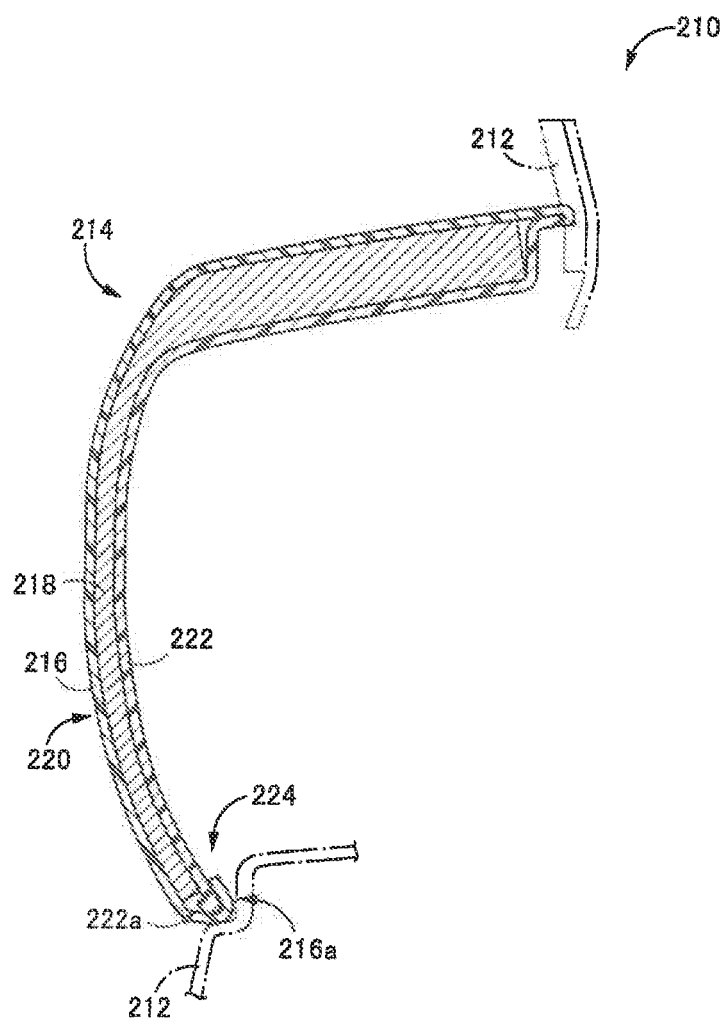
FIG. 11 is a partial sectional view taken along line II-II and viewed in the direction of arrow II-II in FIG. 10.

FIG. 10 is a schematic front view showing the configuration of a vehicle door including a vehicle interior panel 214 (hereinafter simply referred to as the panel 214) according to a preferred embodiment of the present invention, as viewed from the design surface side of the vehicle interior panel 214, namely as viewed from the passenger compartment side (interior side) of a vehicle. As shown in FIG. 11, the panel 214 of the present embodiment is a member that is attached to an inner panel of an automobile door 210, namely to a door inner plate 212, and corresponds to a part of a vehicle door trim that is disposed on the design surface side of the door 210. That is, the present embodiment is described with respect to an example in which the present invention is applied to a vehicle door trim that is attached to a door inner plate. However, the vehicle interior panel of the present invention is also applied in a preferable manner to, e.g., vehicle interior parts such as a luggage side trim, an instrument panel, and an armrest, ornaments that are attached to such interior parts, etc.

Figure 12:
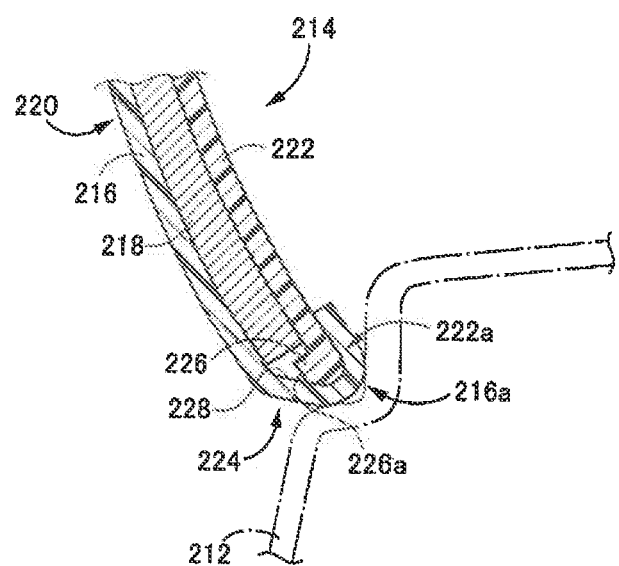
FIG. 12 is an enlarged partial sectional view of a region around a terminal portion of the vehicle interior panel in FIG. 11 which is located on the lower side of the vehicle.
Figure 13:
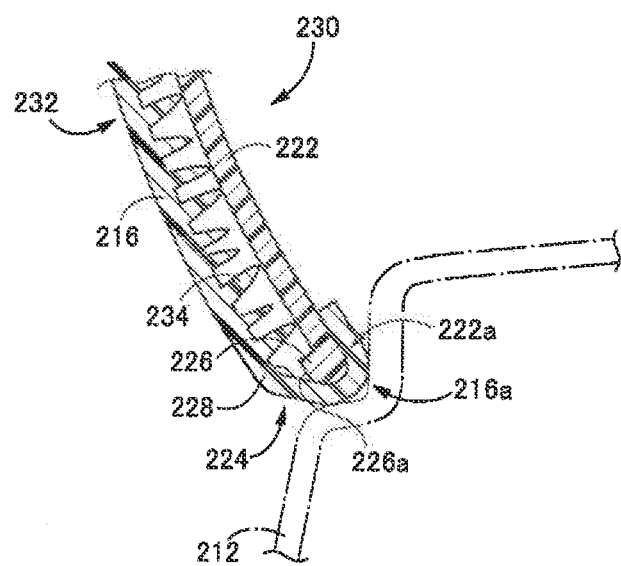
FIG. 13 is an enlarged sectional view of a region around a terminal portion of a vehicle interior panel according to still another embodiment, namely a third embodiment of the present invention which is located on the lower side of a vehicle.

FIG. 11 is a partial sectional view taken along line II-II and viewed in the direction of arrow II-II in FIG. 10, showing in detail the configuration around the panel 214. In FIGS. 11 to 13, the door inner plate 212 (the portion other than the panel 214) is shown by alternate long and short dash lines. As shown in FIG. 11, the panel 214 includes an upholstery material 216, a cushioning material 218, and a base material 222, each being a plate-shaped member curved three-dimensionally into a three-dimensional shape. In the present embodiment, the base material 222 corresponds to the base plate. A surface layer member 220, which is a laminate of the upholstery material 216 and the cushioning material 218, covers the front surface (surface on the interior side of the vehicle) of the base material 222 such that the upholstery material 216 faces the interior side (passenger compartment side) of the vehicle. In other words, the surface layer member 220 having the upholstery material 216 on the front side and the cushioning material 218 on the back side is bonded to the front surface of the base material 222 such that the upholstery material 216 faces the interior side of the vehicle. Alternatively, the surface layer member 220 may be fixed to the base material 222 by fitting a terminal portion of the surface layer member 220 on the base material 222. The base material 222 may have a boss etc. on its back surface (on the opposite design surface side), and the surface layer member 220 may be fixed to the base material 222 by engaging the surface layer member 220 with the boss etc. In the panel 214, the upholstery material 216 corresponds to the upholstery portion and the cushioning material 218 corresponds to the cushioning portion.

For example, the upholstery material 216 is made of any of various thermoplastic resin materials such as soft polyvinyl chloride, styrene thermoplastic resin materials, olefin thermoplastic resin materials, and polyester thermoplastic resin materials. Alternatively, the upholstery material 216 may be made of any of various upholstery materials such as woven or nonwoven fabric, knitted fabric, vinyl chloride, soft films, and natural materials including wool and cowhide. For example, the cushioning material 218 is made of a synthetic resin material such as a polypropylene resin or a urethane resin so as to have predetermined elasticity, namely such cushioning properties that the cushioning material 218 is elastically deformed when pressed. Preferred examples of the synthetic resin material include urethane foam and sponge rubber. For example, the base material 222 is made of a relatively hard synthetic resin material such as a polypropylene resin, rigid polyvinyl chloride, an ABS resin, or an AS resin. The base material 222 may be made of a wood material, a metal material, etc.

The panel 214 includes a terminal portion structure 224 in which a fold-back terminal portion 216a of the upholstery material 216 is tucked in around a terminal portion 222a of the base material 222. FIG. 12 is an enlarged partial sectional view of a region around a terminal portion of the panel 214 in FIG. 11 which is located on the lower side of the vehicle, illustrating the terminal portion structure 224. As shown in FIG. 12, the terminal portion of the base material 222 includes an inward flange portion (flange-shaped portion) 226 projecting in the shape of a flange toward the interior side of the vehicle. In other words, the terminal portion 222a of the base material 222 is bent into the shape of a flange projecting toward the interior side of the vehicle. The fold-back terminal portion 216a of the upholstery material 216 is formed by folding back a terminal portion of the upholstery material 216 toward the exterior side of the vehicle (toward the outside of the vehicle, toward the opposite design surface side) so as to tuck in the terminal portion of the upholstery material 216 around the terminal portion 222a of the base material 222 which includes the inward flange portion 226 and thus to apply a tensile force to the upholstery material 216. That is, the terminal portion structure 224 includes the terminal portion 222a of the base material 222 which includes the inward flange portion 226 projecting toward the interior side of the vehicle (the inner side of the vehicle), and the fold-back terminal portion 216a of the upholstery material 216 which is tucked in around the terminal portion 222a. The present embodiment is described with respect to an example in which the terminal portion structure 224 is applied to the terminal portion of the panel 214 which is located on the lower side of the vehicle. However, the terminal portion structure 224 of the present embodiment is also applied in a preferable manner to a terminal portion of the panel 214 which is located on the upper side of the vehicle, a terminal portion of the panel 214 which is located on the lateral side (in the lateral direction) of the vehicle, etc.

In the terminal portion structure 224, the panel 214 has a clearance 228 between a terminal 226a of the inward flange portion 226 and the upholstery material 216. That is, it is ensured that the clearance 228 corresponding to a predetermined interval of, e.g., about 2 mm is present between the terminal (end, edge) 226a of the inward flange portion 226 which is located on the interior side of the vehicle and the inner surface of the upholstery material 216 which is located on the exterior side of the vehicle (the opposite design surface side). In other words, the inward flange portion 226 projects so that the clearance 228 is present between the inward flange portion 226 and the upholstery material 216. The terminal 226a of the inward flange portion 226 is formed by cutting off, e.g., about 2 mm of the tip end of the inward flange portion 226 so as to ensure that the clearance 228 is present between the terminal 226a and the upholstery material 216.

Still another preferred embodiment of the present invention will be described in detail below with reference to the drawings. In the figure used in the following description, those portions common to the second and third embodiments are denoted with the same reference characters and description thereof will be omitted.

Third Embodiment

FIG. 13 is an enlarged sectional view of a region around a terminal portion of a vehicle interior panel 230 (hereinafter simply referred to as the panel 230) which is located on the lower side of a vehicle, illustrating a terminal portion structure 224 of the panel 230 according to another preferred embodiment of the present invention. FIG. 13 corresponds to FIG. 12 in the second embodiment. In the panel 230 of the present embodiment, an upholstery material 216 that forms a surface layer member 232 is made of, e.g., a synthetic resin material having predetermined elasticity, namely such cushioning properties that the upholstery material 216 is elastically deformed when pressed. The upholstery material 216 has multiple elastic projections 234 formed on its surface on the exterior side of the vehicle (the opposite design surface side) so as to project toward a base material 222. That is, the multiple elastic projections 234 projecting toward the base material 222 are formed integrally with the upholstery material 216 so that space is created between the upholstery material 216 and the base material 222. The upholstery' material 216 covers the base material 222 such that at least a part of the elastic projections 234 contacts the surface of the base material 222 which is located on the interior side of the vehicle. In the panel 230, the tip ends of the elastic projections 234 projecting from the upholstery material 216 are elastically deformed when pressed against the surface of the base material 222, whereby the cushioning properties are provided and a tensile force is applied to the upholstery material 216. That is, in the panel 230 of the present embodiment, the elastic projections 234 formed integrally with the upholstery material 216 correspond to the cushioning portion.

The multiple elastic projections 234 are preferably formed so as to spread all over the upholstery material 216, and flexural rigidity of each elastic projection 234 against a compressive load is anisotropic about the axis of the elastic projection 234. For example, the direction in which each elastic projection 234 projects from the upholstery material 216 is shifted from the direction perpendicular to the upholstery material 216 (e.g., the direction normal to the opposite design surface of the upholstery material 216). There may be an elastic projection(s) 234 that projects in the direction perpendicular to the upholstery material 216. With this configuration, flexural rigidity of each elastic projection 234 against a compressive load is anisotropic about the axis of the elastic projection 234. Accordingly, for example, when the upholstery material 216 is pressed in a substantially perpendicular direction from the interior side of the vehicle (the design surface side), each elastic projection 234 tends to be flexurally deformed in a specific direction determined by the anisotropy, whereby a soft feel (cushioning properties) is improved. Moreover, since the direction in which each elastic projection 234 is bent (buckled) can be controlled, each elastic projection 234 is elastically deformed in a stable manner (the direction in which each elastic projection 234 is bent etc.). This restrains variation in feel at the time the upholstery material 216 is pressed with a finger or a hand.

The panel 230 includes, as the cushioning portion, the elastic projections 234 projecting from the upholstery material 216 toward the base material 222. However, the panel 230 may include multiple elastic projections projecting from the base material 222 toward the upholstery material 216, and these elastic projections may function as the cushioning portion.

According to the embodiment described above, a terminal portion of the base material 222 includes an inward flange portion 226 projecting toward the interior side of the vehicle, and the upholstery material 216 serving as the upholstery portion includes a fold-back terminal portion 216a that is formed by folding back a terminal portion of the upholstery material 216 toward the exterior side of the vehicle so as to tuck in the terminal portion of the upholstery material 216 around a terminal portion 222a of the base material 222 which includes the inward flange portion 226. There is clearance 228 between the terminal 226a of the inward flange portion 226 and the upholstery material 216. Accordingly, the cushioning material 218 or the elastic projections 234 which serve as the cushioning portion can be prevented in a preferable manner from being crushed by the fold-back terminal portion 216a of the upholstery material 216. This can ensure a soft feel of a terminal portion of a product and can restrain problems such as reduced strength and defective molding due to the difference in thickness. That is, the panels 214, 230 can be provided which achieve an improved feel of a terminal portion of a product while ensuring desired design.

According to the present embodiment, the clearance 228 is present between the inward flange portion 226 and the upholstery material 216. Accordingly, even if the cushioning material 218 is crushed, the inward flange portion 226 is restrained from being pressed against the upholstery material 216. This reduces problems such as the shape of the terminal portion of the inward flange portion 226 showing on the design surface of the upholstery material 216. As a result, desired design of the panels 214, 230 can be ensured.

In the panel 230, the cushioning portion is the elastic projections 234 projecting from the upholstery material 216 toward the base material 222. Accordingly, forming the cushioning portion integrally with the upholstery material 216 can reduce the material cost and can thus achieve cost reduction.

Fourth Embodiment

Figure 14:
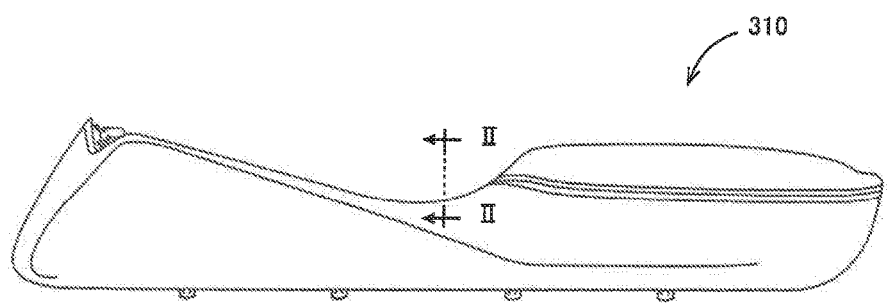
FIG. 14 is a perspective view of an armrest of a vehicle composite interior part according to a fourth embodiment of the present invention.

FIG. 14 is a perspective view schematically showing the configuration of an armrest 310 as an example of a vehicle composite interior part according to a preferred embodiment of the present invention, as viewed from the design surface side of the armrest 310. For example, the armrest 310 of the present embodiment is a plate-shaped member that is attached to an inner panel of a right door of an automobile, namely to a door inner plate, and corresponds to a part of a vehicle door trim that is disposed on the design surface side of the door. In the present embodiment, the design surface refers to the surface of the armrest 310 which is visible from the interior of a vehicle, and the design surface side corresponds to the side of the vehicle composite interior part which is located on the interior (passenger compartment) side of the vehicle. The opposite design surface refers to the opposite surface from the design surface, namely the surface that is not visible from the interior of the vehicle, and the opposite design surface side corresponds to the exterior side of the vehicle. The present embodiment is described with respect to an example in which the present invention is applied to the armrest 310 that is attached to a door inner plate. However, the present invention is also applied in a preferable manner to, e.g., vehicle composite interior parts such as a luggage side trim, an instrument panel, an armrest, and ornaments that are attached thereto.

Figure 15:
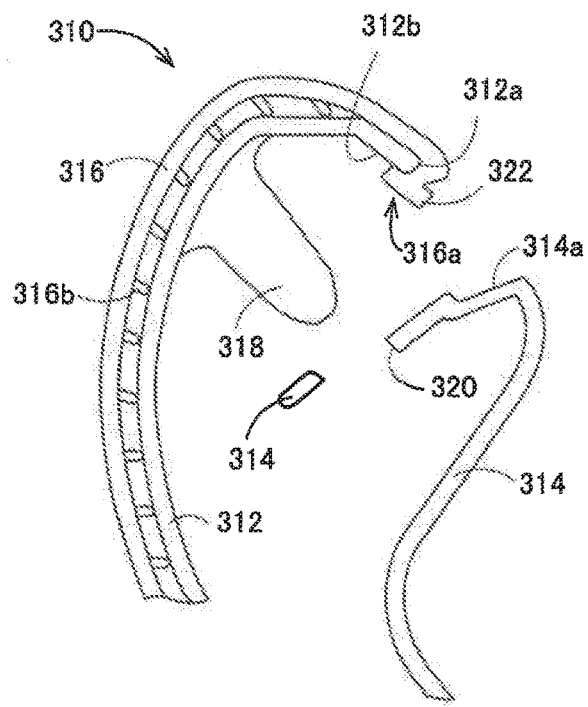
FIG. 15 is an enlarged sectional view of a main part of the fourth embodiment taken along line II-II and viewed in the direction of arrow II-II in the armrest of FIG. 14, and shows a state before assembly.
Figure 16:
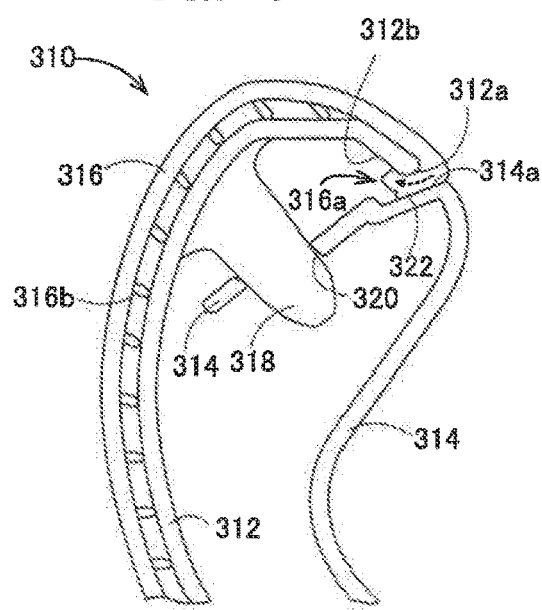
FIG. 16 is an enlarged sectional view of the main part in the fourth embodiment of FIG. 15, and shows an assembled state.

FIGS. 15 and 16 are enlarged sectional views of a main part taken along line II-II and viewed in the direction of arrow II-II in FIG. 14, namely enlarged partial sectional views showing a region around a terminal portion (end on the upper side of the vehicle) of the armrest 310. FIG. 15 shows a state before assembly, and FIG. 16 shows an assembled state. As shown in FIGS. 15 and 16, when assembling the armrest 310 by fitting a pull handle 314, which is a molded part made of a relatively hard synthetic resin, in a base material 312, which is a similar molded part made of a relatively hard synthetic resin, an edge portion of a soft surface layer member 316 that covers the base material 312 is held between a mating surface 312a of the base material 312 and a mating surface 314a of the pull handle 314. An edge portion 316a of the soft surface layer member 316 is thus tucked in and fixed therebetween. A positioning projection 318 projecting from the base material 312 toward the pull handle 314 is fitted in a positioning hole 320 extending through an inwardly bent end of the pull handle 314, whereby the base material 312 and the pull handle 314 are positioned with respect to each other.

For example, the base material 312 and the pull handle 314 are made of a relatively hard synthetic resin material such as a polypropylene resin, rigid polyvinyl chloride, an ABS resin, or an AS resin. In the present embodiment, the base material 312 corresponds to the first member, and the pull handle 314 corresponds to the second member.

The soft surface layer member 316 has multiple elastic projections 316b formed on its surface on the opposite design surface side so as to project toward the base material 312. The soft surface layer member 316 has cushioning properties as these elastic projections function as the cushioning portion. The soft surface layer member 316 is bonded to the base material 312 so as to cover the front surface (surface on the design surface side) of the base material 312, so that the soft surface layer member 316 is located on the interior side (passenger compartment side) of the vehicle. For example, the soft surface layer member 316 may include, instead of or in addition to the multiple elastic projections, urethane foam, sponge rubber, etc. which is comprised of a synthetic resin material such as a polypropylene resin or a urethane resin so as to have predetermined elasticity, namely such cushioning properties that the soft surface layer member 316 is elastically deformed when pressed.

The soft surface layer material 316 is made of a relatively soft (flexible) material that is easily elastically deformed with the force of an operator's finger etc. The soft surface layer member 316 is preferably made of a soft synthetic resin material, and preferred examples of the soft synthetic resin material include various thermoplastic resin materials such as soft polyvinyl chloride, styrene thermoplastic resin materials, olefin thermoplastic resin materials, and polyester thermoplastic resin materials. Alternatively, the soft surface layer member 316 may be made of any of various upholstery materials such as woven or nonwoven fabric, knitted fabric, vinyl chloride, soft films, and natural materials including wool and cowhide.

As shown in FIGS. 15 and 16, the armrest 310 has a structure in which the edge portion of the soft surface layer member 316 that covers the base material 312 is held between the mating surface 312a of the base material 312 and the mating surface 314a of the pull handle 314 such that the fold-back edge portion 316a of the soft surface layer member 316 is tucked in around the mating surface 312a that is an edge of the base material 312.

As shown in FIG. 15, a surface layer-side projecting portion 322, which projects from the edge portion 316a of the soft surface layer member 316 toward the pull handle 314 and which is pressed toward the base material 312 by the pull handle 314 as the edge portion 316a of the soft surface layer member 316 is held between the mating surface 312a of the base material 312 and the mating surface 314a of the pull handle 314, is formed in the fold-back edge portion 316a of the soft surface layer member 316 at a position adjacent to the mating surface 312a of the base material 312 on the back surface 312b side of the base material 312. This surface layer-side projecting portion 322 functions as a tensile force generating portion that presses the edge portion 316a of the soft surface layer member 316 toward the back surface 312b of the base material 312 to apply a tensile force to the soft surface layer member 316 when the base material 312 and the pull handle 314 are attached to each other.

According to the armrest 310 of the present embodiment, the surface layer-side projecting portion 322, which projects from the edge portion 316a of the soft surface layer member 316 toward the pull handle 314 and which is pressed toward the base material 312 by the pull handle 314 as the edge portion 316a of the soft surface layer member 316 is held between the mating surface 312a of the base material 312 and the mating surface 314a of the pull handle 314, is formed in the fold-back edge portion 316a of the soft surface layer member 316 at a position adjacent to the mating surface 312a of the base material 312 on the back surface 312b side of the base material 312. Accordingly, as shown in FIGS. 15 and 16, when the mating surface 312a of the base material 312 and the mating surface 314a of the pull handle 314 are moved toward each other to attach the base material 312 and the pull handle 314 to each other, the surface layer-side projecting portion 322 projecting from the soft surface layer member 316 toward the pull handle 314 presses the edge portion 316a of the soft surface layer member 316 toward the back surface 312b of the base material 312 and pulls the soft surface layer member 316 as shown by a dashed arrow in FIG. 16, thereby applying a tensile force to the soft surface layer member 316. The soft surface layer member 316 can thus be easily attached without causing undesirable slack and undesirable coming-off of the soft surface layer member 316.

According to the armrest 310 of the present embodiment, since the surface layer-side projecting portion 322 is present inside the compression position between the mating surface 312a of the base material 312 and the mating surface 314a of the pull handle 314, a pull-out load for the soft surface layer member 316 is increased. The edge portion 316a of the soft surface layer member 316 is therefore more firmly fixed as compared to a conventional structure shown in FIGS. 26 to 28.

Fifth Embodiment

Further embodiments of the present invention will be described below. In the following description of the fifth to eighth embodiments, those portions which are common between or among the embodiments are denoted with the same reference characters and description thereof will be omitted.

Figure 17:
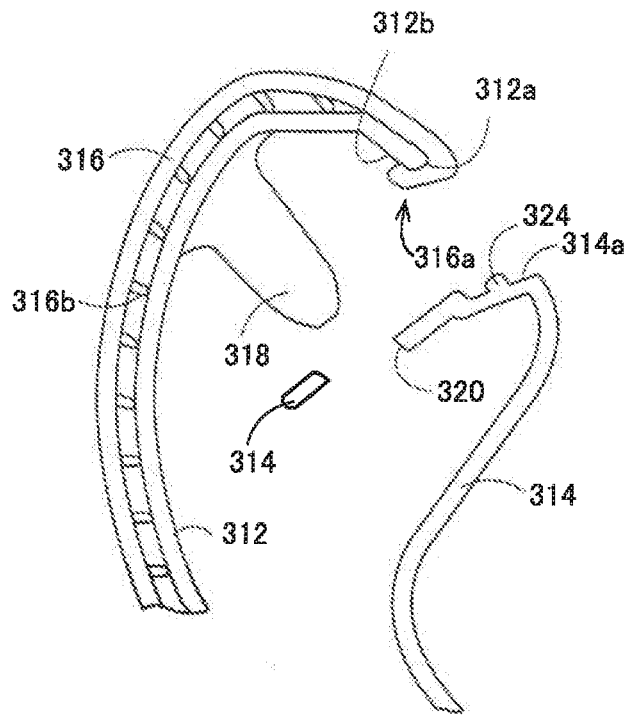
FIG. 17 is an enlarged sectional view of a main part of a fifth embodiment taken along line II-II and viewed in the direction of arrow II-II in the armrest of FIG. 14, and shows a state before assembly.
Figure 18:
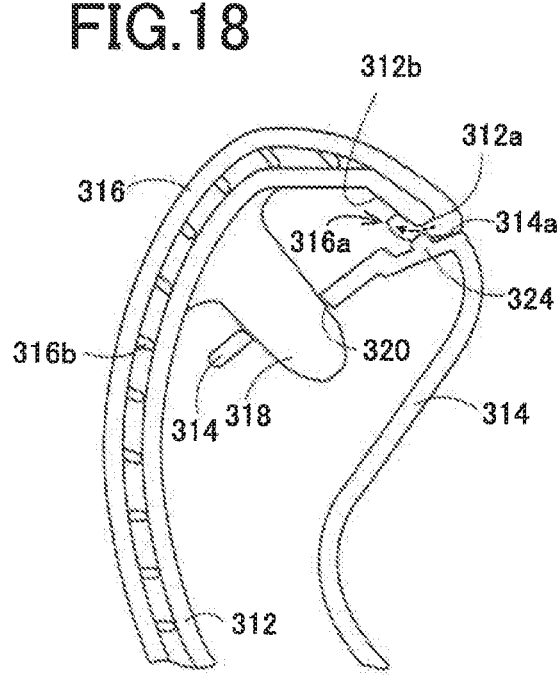
FIG. 18 is an enlarged sectional view of the main part in the fifth embodiment of FIG. 17, and shows an assembled state.

FIGS. 17 and 18 are enlarged partial sectional views showing a region around a terminal portion (end on the upper side of a vehicle) in another embodiment of the armrest 310. FIG. 17 shows a state before assembly, and FIG. 18 shows an assembled state. As shown in FIGS. 17 and 18, in the armrest 310 of the present embodiment, a pull handle-side projecting portion 324, which presses an edge portion 316a of a soft surface layer member 316 toward a base material 312 along a back surface 312b of the base material 312 as the edge portion 316a of the soft surface layer member 316 is held between a mating surface 312a of the base material 312 and a mating surface 314a of a pull handle 314, is formed at a position adjacent to the mating surface 314a of the pull handle 314 on the back surface side of the base material 312 so as to project from the pull handle 314 toward the base material 312. This pull handle-side projecting portion 324 corresponds to the second member-side projecting portion and functions as a tensile force generating portion that presses the edge portion 316a of the soft surface layer member 316 toward the back surface 312b of the base material 312 to apply a tensile force to the soft surface layer member 316 when the base material 312 and the pull handle 314 are attached to each other.

According to the armrest 310 of the present embodiment, the pull handle-side projecting portion 324, which projects from the pull handle 314 toward the base material 312 and which presses the edge portion 316a of the soft surface layer member 316 toward the base material 312 along the back surface 312b of the base material 312 as the edge portion 316a of the soft surface layer member 316 is held between the mating surface 312a of the base material 312 and the mating surface 314a of the pull handle 314, is formed at a position adjacent to the mating surface 314a of the pull handle 314 on the back surface side of the base material 312. Accordingly, as shown in FIGS. 17 and 18, when the mating surface 312a of the base material 312 and the mating surface 314a of the pull handle 314 are moved toward each other to attach the base material 312 and the pull handle 314 to each other, the pull handle-side projecting portion 324 presses the edge portion 316a of the soft surface layer member 316 toward the back surface of the base material 312 and pulls the soft surface layer member 316 as shown by a dashed arrow in FIG. 18, thereby applying a tensile force to the soft surface layer member 316. The base material 312 and the pull handle 314 can thus be easily attached to each other without causing undesirable slack and undesirable coming-off of the soft surface layer member 316.

According to the armrest 310 of the present embodiment, the presence of the pull handle-side projecting portion 324 increases the area where the soft surface layer member 316 wraps the base material 312 and increases a pull-out load for the soft surface layer member 316. The edge portion 316a of the soft surface layer member 316 is therefore more firmly fixed as compared to the conventional structure shown in FIGS. 26 to 28.

Sixth Embodiment

Figure 19:
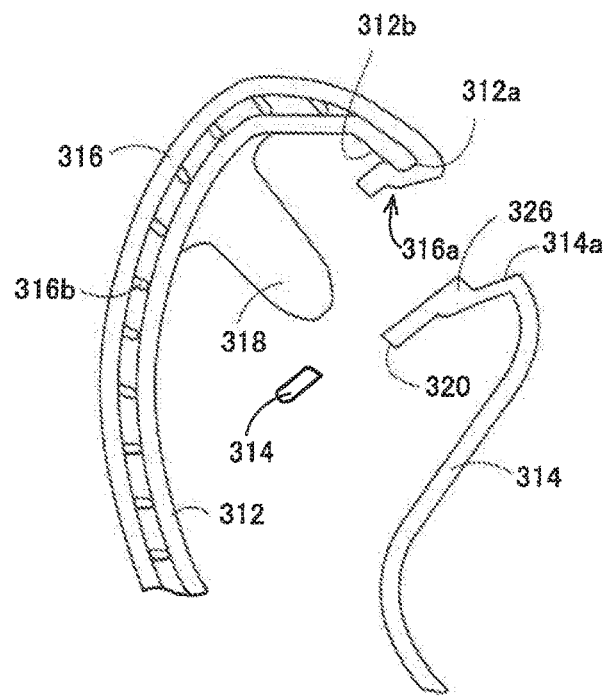
FIG. 19 is an enlarged sectional view of a main part of a sixth embodiment taken along line II-II and viewed in the direction of arrow II-II in the armrest of FIG. 14, and shows a state before assembly.
Figure 20:
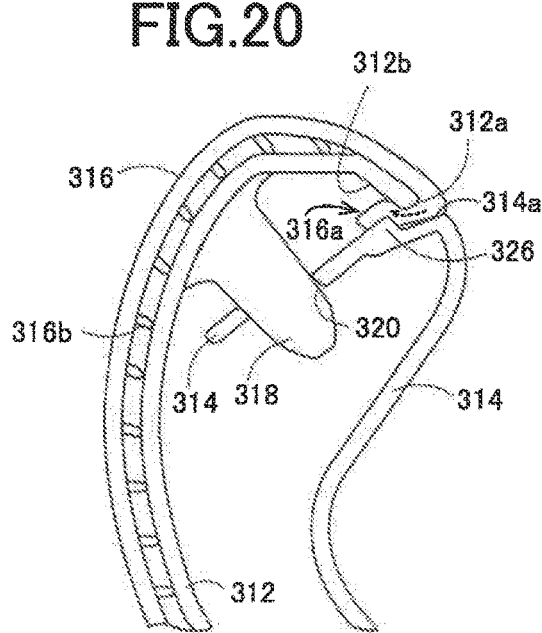
FIG. 20 is an enlarged sectional view of the main part in the sixth embodiment of FIG. 19, and shows an assembled state.

FIGS. 19 and 20 are enlarged partial sectional views showing a region around a terminal portion (end on the upper side of a vehicle) in another embodiment of the armrest 310. FIG. 19 shows a state before assembly, and FIG. 20 shows an assembled state. As shown in FIGS. 19 and 20, in the armrest 310 of the present embodiment, a stepped portion 326, which presses an edge portion 316a of a soft surface layer member 316 toward a base material 312 along a back surface 312b of the base material 312 as the edge portion 316a of the soft surface layer member 316 is held between a mating surface 312a of the base material 312 and a mating surface 314a of a pull handle 314, is formed in the pull handle 314 at a position adjacent to the mating surface 312a of the base material 312 on the back surface 312b side of the base material 312 so as to project from the pull handle 314 toward the base material 312. This stepped portion 326 functions as a tensile force generating portion that presses the edge portion 316a of the soft surface layer member 316 toward the back surface 312b of the base material 312 to apply a tensile force to the soft surface layer member 316 when the base material 312 and the pull handle 314 are attached to each other.

According to the armrest 310 of the present embodiment, the stepped portion 326, which presses the edge portion 316a of the soft surface layer member 316 toward the base material 312 along the back surface 312b of the base material 312 as the edge portion 316a of the soft surface layer member 316 is held between the mating surface 312a of the base material 312 and the mating surface 314a of the pull handle 314, is formed in the pull handle 314 at a position adjacent to the mating surface 312a of the base material 312 on the back surface 312b side of the base material 312 so as to project from the pull handle 314 toward the base material 312. Accordingly, as shown in FIGS. 19 and 20, when the mating surface 312a of the base material 312 and the mating surface 314a of the pull handle 314 are moved toward each other to attach the base material 312 and the pull handle 314 to each other, the stepped portion 326 presses the edge portion 316a of the soft surface layer member 316 toward the back surface of the base material 312 and pulls the soft surface layer member 316 as shown by a dashed arrow in FIG. 20, thereby applying a tensile force to the soft surface layer member 316. The base material 312 and the pull handle 314 can thus be easily attached to each other without causing undesirable slack and undesirable coming-off of the soft surface layer member 316.

According to the armrest 310 of the present embodiment, the presence of the stepped portion 326 increases the area where the soft surface layer member 316 wraps the base material 312 and increases a pull-out load for the soft surface layer member 316. The edge portion 316a of the soft surface layer member 316 is therefore more firmly fixed as compared to the conventional structure shown in FIGS. 26 to 28.

Seventh Embodiment

Figure 21:
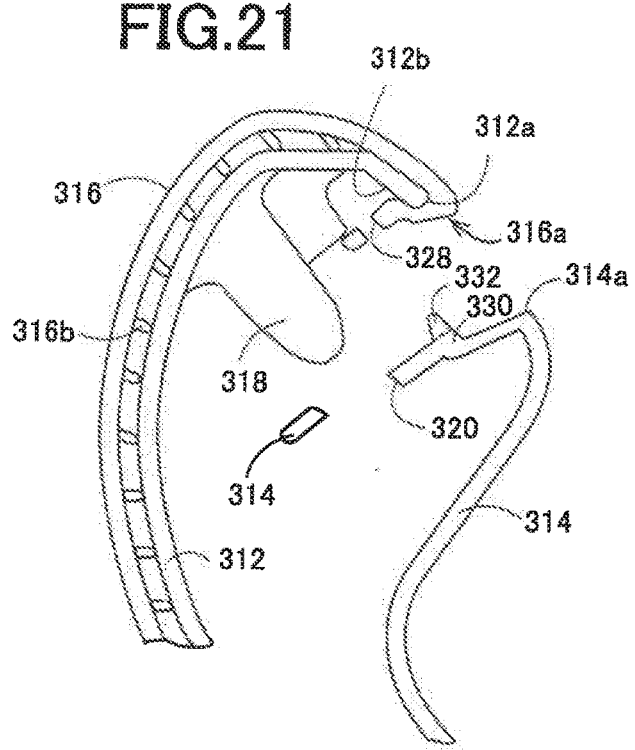
FIG. 21 is an enlarged sectional view of a main part of a seventh embodiment taken along line II-II and viewed in the direction of arrow II-II in the armrest of FIG. 14, and shows a state before assembly.
Figure 22:
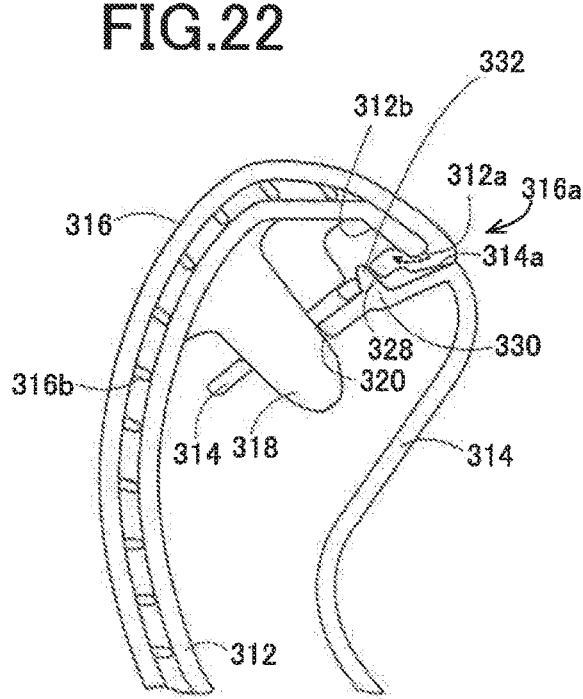
FIG. 22 is an enlarged sectional view of the main part in the seventh embodiment of FIG. 21, and shows an assembled state.

FIGS. 21 and 22 are enlarged partial sectional views showing a region around a terminal portion (end on the upper side of a vehicle) in another embodiment of the armrest 310. FIG. 21 shows a state before assembly, and FIG. 22 shows an assembled state. As shown in FIGS. 21 and 22, the armrest 310 of the present embodiment includes: an engagement hole 328 formed in an edge portion 316a of a soft surface layer member 316 at a position adjacent to a mating surface 312a of a base material 312 on the back surface 312b side of the base material 312 so as to extend through the edge portion 316a; a projecting engagement base 330 formed in a pull handle 314 at a position on the base material 312 side of the mating surface 312a of the base material 312 so as to be located inside the base material 312; and an engagement projection 332 that projects from the engagement base 330 toward the base material 312 and that engages with the engagement hole 328 and pulls the edge portion 316a of the soft surface layer member 316 toward the back surface 312b of the base material 312 as the edge portion 316a of the soft surface layer member 316 is held between a mating surface 312a of the base material 312 and a mating surface 314a of the pull handle 314. In the present embodiment, the engagement hole 328, the engagement base 330, and the engagement projection 332 function as a tensile force generating portion that presses the edge portion 316a of the soft surface layer member 316 toward the back surface 312b of the base material 312 to apply a tensile force to the soft surface layer member 316 when the base material 312 and the pull handle 314 are attached to each other.

According to the armrest 310 of the present embodiment, the engagement hole 328 formed in the edge portion 316a of the soft surface layer member 316 at a position adjacent to the mating surface 312a of the base material 312 on the back surface 312b side of the base material 312 so as to extend through the edge portion 316a, the projecting engagement base 330 formed in the pull handle 314 at a position on the base material 312 side of the mating surface 312a of the base material 312 so as to be located inside the base material 312, and the engagement projection 332 that projects from the engagement base 330 toward the base material 312 and that engages with the engagement hole 328 and pulls the edge portion 316a of the soft surface layer member 316 toward the back surface 312b of the base material 312 as the edge portion 316a of the soft surface layer member 316 is held between the mating surface 312a of the base material 312 and the mating surface 314a of the pull handle 314 function as the tensile force generating portion. When the mating surface 312a of the base material 312 and the mating surface 314a of the pull handle 314 are moved toward each other to attach the base material 312 and the pull handle 314 to each other, the edge portion 316a of the soft surface layer member 316 is held between the mating surface 312a of the base material 312 and the mating surface 314a of the pull handle 314. In this process, the engagement projection 332 of the pull handle 314 is engaged with the engagement hole 328 in the soft surface layer member 316, and the engagement position of the engagement hole 328 is then moved onto the engagement base 330. As the engagement base 330 is relatively moved toward the base material 312, the edge portion 316a of the soft surface layer member 316 is pulled toward the back surface 312b of the base material 312 as shown by a dashed arrow in FIG. 22. The base material 312 and the pull handle 314 can thus be easily attached to each other without causing undesirable slack and undesirable coming-off of the soft surface layer member 316.

According to the armrest 310 of the present embodiment, the engagement projection 332 of the pull handle 314 is engaged with the engagement hole 328 in the soft surface layer member 316, and a pull-out load for the soft surface layer member 316 is increased. The edge portion 316a of the soft surface layer member 316 is therefore more firmly fixed as compared to the conventional structure shown in FIGS. 26 to 28.

Eighth Embodiment

Figure 23:
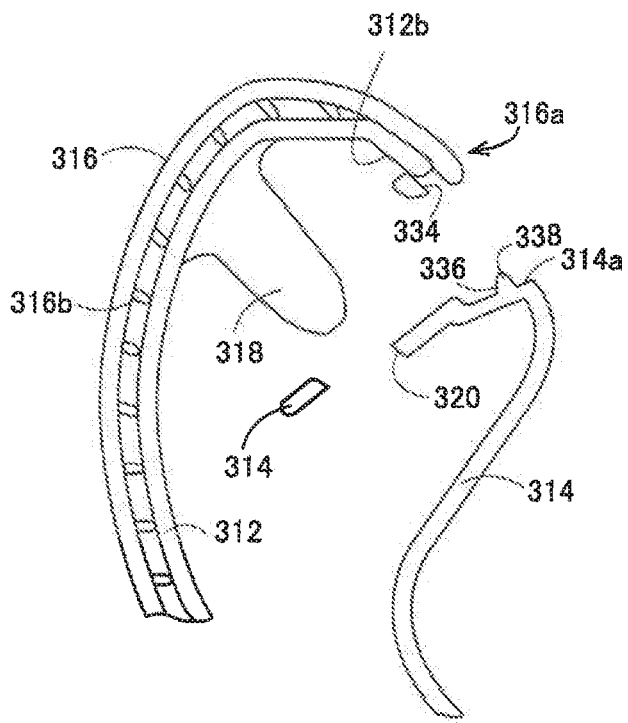
FIG. 23 is an enlarged sectional view of a main part of an eighth embodiment taken along line II-II and viewed in the direction of arrow II-II in the armrest of FIG. 14, and shows a state before assembly.
Figure 24:
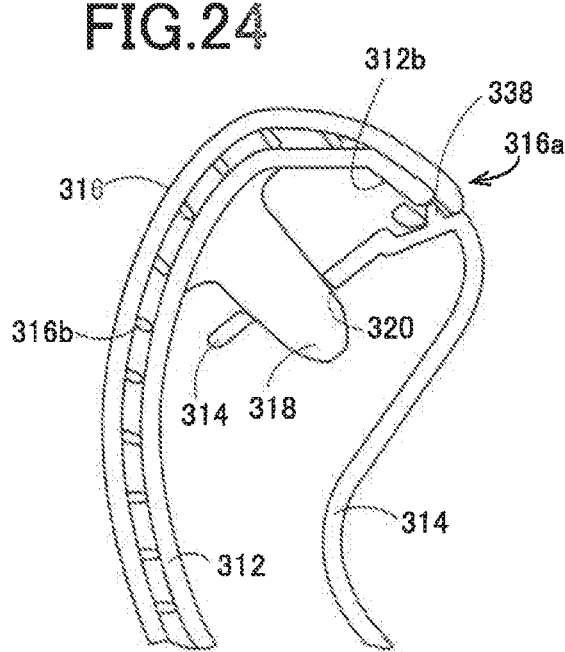
FIG. 24 is an enlarged sectional view of the main part in the eighth embodiment of FIG. 23, and shows an assembled state.
Figure 25:
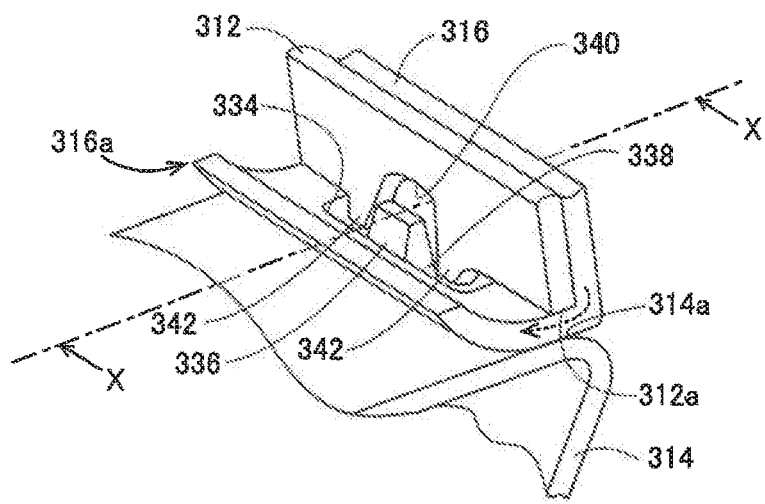
FIG. 25 is a perspective view of the eighth embodiment shown in FIG. 24.

FIGS. 23, 24, and 25 are enlarged views of a main part, showing a region around a terminal portion (end on the upper side of a vehicle) in a further embodiment of the armrest 310. FIGS. 23 and 24 are longitudinal sections of an engagement projection 338 (sectional views taken along line X-X and viewed in the direction of arrow X-X in 15 FIG. 25). FIG. 23 shows a state before assembly, and FIG. 24 shows an assembled state. FIG. 25 is a perspective view showing the assembled state. As shown in FIGS. 23, 24, and 25, the armrest 310 of the present embodiment includes: an engagement hole 334 formed in an edge portion 316a of a soft surface layer member 316 at a position corresponding to a mating surface 312a of a base material 312 so as to extend through the edge portion 316a; a first engagement projection 338 that projects from a mating surface 314a of a pull handle 314 toward the base material 312 and that has an engagement tilted surface 336 tilted toward an edge of the soft surface layer member 316 as it extends to the distal end of the first engagement projection 338; a cutout 340 that is formed in the mating surface 312a of the base material 312 and that receives the engagement projection 338 and avoids interference with the engagement projection 338; and a second engagement projection 342 that is formed on both sides of the cutout 340 so as to extend from the mating surface 312a of the base material 312 toward the mating surface 314a of the pull handle 314 and that projects by a projection amount substantially corresponding to the thickness of the soft surface layer member 316 and engages with the engagement hole 334. In the present embodiment, the engagement hole 334, the engagement tilted surface 336, the first engagement projection 338, the cutout 340, and the second engagement projection 342 function as a tensile force generating portion that presses the edge portion 316a of the soft surface layer member 316 toward the back surface 312b of the base material 312 to apply a tensile force to the soft surface layer member 316 when the base material 312 and the pull handle 314 are attached to each other.

According to the armrest 310 of the present embodiment, the engagement hole 334 formed in the edge portion 316a of the soft surface layer member 316 at a position corresponding to the mating surface 312a of the base material 312 so as to extend through the edge portion 316a, the first engagement projection 338 that projects from the mating surface 314a of the pull handle 314 toward the base material 312 and that has the engagement tilted surface 336 tilted toward the edge of the soft surface layer member 316 as it extends to the distal end of the first engagement projection 338, the cutout 340 that is formed in the mating surface 312a of the base material 312 and that receives the engagement projection 338 and avoids interference with the engagement projection 338, and the second engagement projection 342 that is formed on both sides of the cutout 340 so as to extend from the mating surface 312a of the base material 312 toward the mating surface 314a of the pull handle 314 and that projects by a projection amount substantially corresponding to the thickness of the soft surface layer member 316 function as a tensile force generating portion. When the mating surface 312a of the base material 312 and the mating surface 314a of the pull handle 314 are moved toward each other to attach the base material 312 and the pull handle 314 to each other, the edge portion 316a of the soft surface layer member 316 is held between the mating surface 312a of the base material 312 and the mating surface 314a of the pull handle 314. In this process, the first engagement projection 338 of the pull handle 314 is engaged with the engagement hole 334 in the soft surface layer member 316, and the engagement position of the engagement hole 334 is then moved toward the base end of the first engagement projection 338 along the engagement tilted surface 336 of the first engagement projection 338. As the first engagement projection 338 is relatively moved toward the base material 312, the edge portion 316a of the soft surface layer member 316 is pulled toward the back surface 312b of the base material 312 as shown by a dashed arrow in FIG. 25. The base material 312 and the pull handle 314 can thus be easily attached to each other without causing undesirable slack and undesirable coming-off of the soft surface layer member 316.

According to the armrest 310 of the present embodiment, the first engagement projection 338 projecting from the mating surface 314a of the pull handle 314 is engaged with the engagement hole 334 extending through the edge portion 316a of the soft surface layer member 316, and a pull-out load for the soft surface layer member 316 is increased. The edge portion 316a of the soft surface layer member 316 is therefore more firmly fixed as compared to the conventional structure shown in FIGS. 26 to 28.

The armrest 310 of the present embodiment includes the second engagement projection 342 that is formed on both sides of the cutout 340 so as to extend from the mating surface 312a of the base material 312 toward the mating surface 314a of the pull handle 314, projects by a projection amount substantially corresponding to the thickness of the soft surface layer member 316, and that engages with the engagement hole 334. The armrest 310 of the present embodiment is therefore advantageous in that the edge portion 316a of the soft surface layer member 316 is more firmly fixed.

Figure 26:
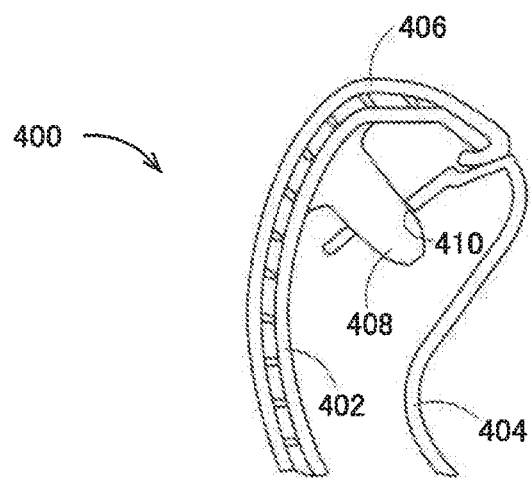
FIG. 26 is a sectional view of a main part of a conventional armrest, and shows an assembled state.

FIG. 26 is a sectional view of a main part, showing a handle portion of an armrest 400 that is one type of conventional vehicle composite interior parts. When fitting a pull handle 404, which is a molded part made of a relatively hard synthetic resin, in a base material 402, which is a similar molded part made of a relatively hard synthetic resin, to attach the pull handle 404 to the base material 402, an edge portion of a soft surface layer member 406 that covers the base material 402 is held between a mating surface of the base material 402 and a mating surface of the pull handle 404. The edge portion of the soft surface layer member 406 is thus tucked in and fixed therebetween. In the sectional view of the main part shown in FIG. 26, a positioning projection 408 projecting from the base material 402 toward the pull handle 404 is fitted in a positioning hole 410 extending through an inwardly bent end of the pull handle 404, whereby the base material 402 and the pull handle 404 are positioned with respect to each other.

Figure 27:
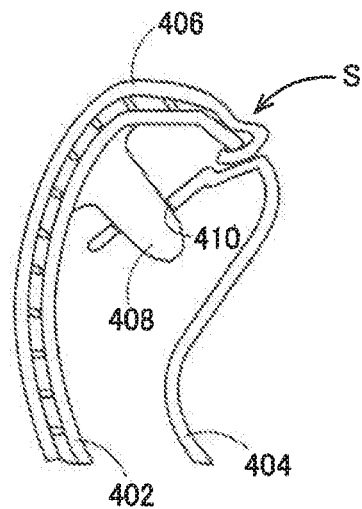
FIG. 27 is a sectional view of the main part of the conventional armrest of FIG. 26, showing an example in which appearance is impaired due to the edge portion of the soft surface layer member being curved inward or becoming slack.
Figure 28:
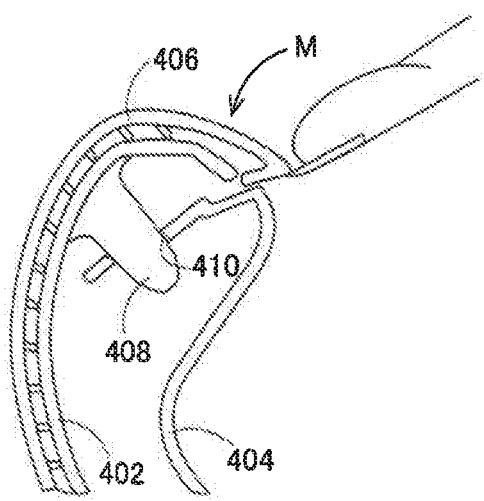
FIG. 28 is a sectional view of the main part of the conventional armrest of FIG. 26, showing an example in which a problem has occurred due to peel-off of the edge portion of the soft surface layer member.

In the above conventional vehicle composite interior part such as the armrest 400 shown in FIG. 27, the part of the edge portion of the soft surface layer member 406 which is tucked in and held between the mating surface of the base material 402 and the mating surface of the pull handle 404 is short. Accordingly, if a fingernail is caught by the soft surface layer member 406, appearance may be impaired due to the edge portion of the soft surface layer member 406 being curved inward or becoming slack as shown by S in FIG. 27, or the edge portion of the soft surface layer member 406 may peel off and come off as shown by M in FIG. 28.

Such problems can be reduced by increasing the length of the part of the edge portion of the soft surface layer member 406 which is tucked in and held between the mating surface of the base material 402 and the mating surface of the pull handle 404. However, this solution is disadvantageous because this solution not only affects ease of assembly of the armrest 400 but also affects mold release of the soft surface layer member 406 in the process of molding the soft surface layer member 406 and thus cannot achieve desired productivity.

Ninth Embodiment

Figure 29:
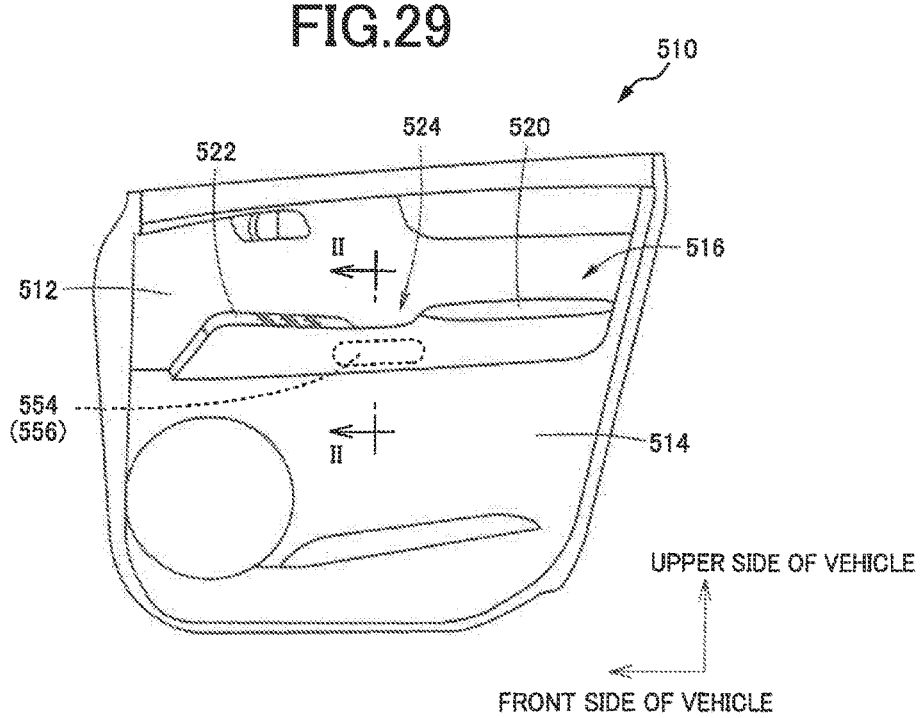
FIG. 29 is a schematic front view of a vehicle door to which the present invention is applied, as viewed from the design surface side (the interior side of a passenger compartment).
Figure 30:
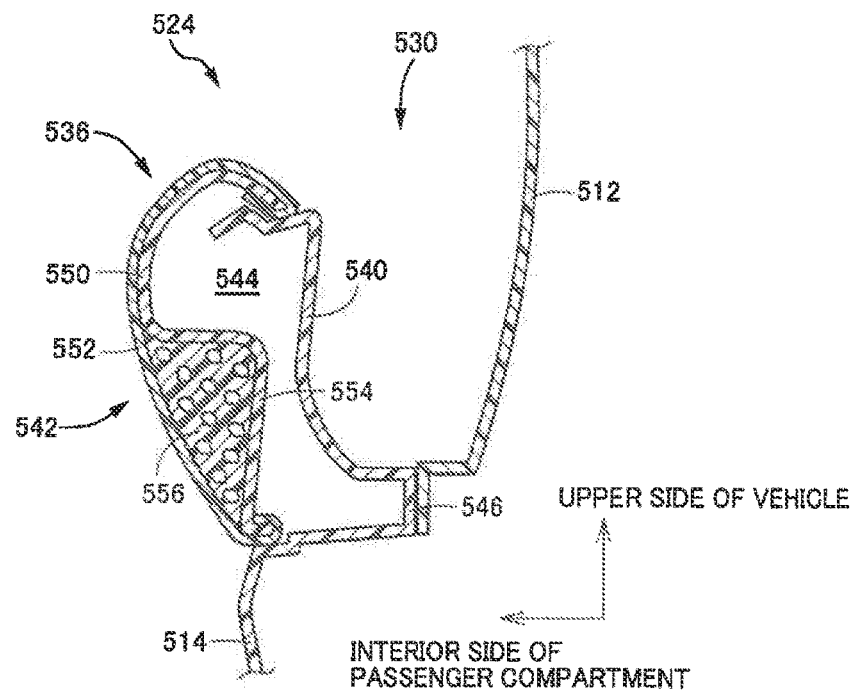
FIG. 30 is a sectional view of a portion taken along line II-II and viewed in the direction of arrow II-II in FIG. 29, namely a pull handle portion.

FIG. 29 is a schematic front view of a vehicle door 510 to which the present invention is applied, as viewed from the design surface side (the interior side of a passenger compartment), and FIG. 30 is a sectional view taken along line II-II and viewed in the direction of arrow II-II in FIG. 29. The vehicle door 510 is disposed on the right side of the vehicle and is opened and closed about a substantially vertical axis via a hinge, not shown, attached to the front end of the vehicle door 510 which is located on the front side of the vehicle. The vehicle door 510 includes a door trim upper 512 and a door trim lower 514 as a door trim. An armrest 516 is fixedly attached to the boundary portion between the door trim upper 512 and the door trim lower 514. Both the door trim upper 512 and the door trim lower 514 are made of a relatively rigid synthetic resin material such as rigid polyvinyl chloride.

Figure 31:
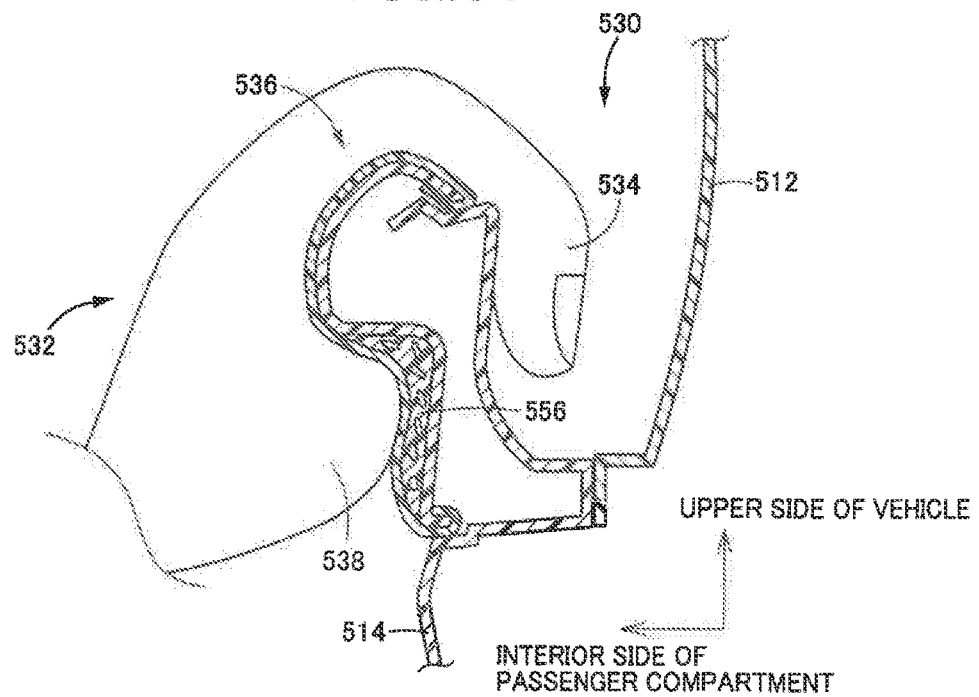
FIG. 31 is a sectional view showing a holding portion of the pull handle of FIG. 29 being held with a hand.

The armrest 516 has a longitudinal shape that is long in the longitudinal direction of the vehicle and is disposed in a substantially horizontal attitude. The armrest 516 has an armrest portion 520 in its rear part, has in its front part a switch arrangement portion 522 where a power window switch etc. are arranged, and has in an intermediate part between the front and rear parts a pull handle portion 524 that is held when opening and closing the vehicle door 510. As can be seen from a sectional view of FIG. 30, the pull handle portion 524 is in the shape of a pocket having an opening portion 530 that opens upward. As shown in FIG. 31, the pull handle portion 524 is a portion a driver etc. uses to open and close the vehicle door 510 by placing a finger 534 of his/her hand 532 into the opening portion 530 and holding between a palm 538 and the finger 534 of his/her hand 532 a hold portion 536 that forms a sidewall of the pocket shape on the interior side of the passenger compartment. The hand 532 in FIG. 31 is a right hand as viewed from the little finger side.

The hold portion 536 has a hollow structure having an inner wall 540 located on the inner side of the pocket shape, namely on the door trim upper 512 side, an outer wall 542 located on the outer side of the pocket shape, namely on the interior side of the passenger compartment, and a hollow portion 544 formed between the inner wall 540 and the outer wall 542. The inner wall 540 is formed integrally with the door trim lower 514. The inner wall 540 is a portion projecting upward from a coupling portion 546 that is coupled to the lower end of the door trim upper 512. The inner wall 540 together with the lower end of the door trim upper 512 forms the pocket shape having a U-shaped section.

The outer wall 542 of the hold portion 536 is a separate part from the door trim lower 514 and is made of a laminate material that has a plate-shaped base material 550 and an upholstery material 552 made of a soft material and covering the base material 550. The outer wall 542 is fixedly attached to the door trim lower 514 by a retaining pawl, welding, an adhesive, etc. such that the outer peripheral edge portion of the outer wall 542 abuts on the door trim lower 514. The base material 550 is made of a relatively rigid synthetic resin material such as rigid polyvinyl chloride, and the upholstery material 552 is made of an elastically deformable thermoplastic resin such as soft polyvinyl chloride, a styrene thermoplastic resin material, an olefin thermoplastic resin material, or a polyester thermoplastic resin material. The base material 550 has a recessed portion 554 formed at a position lower than the opening portion 530, namely lower than the upper end portion of the hold portion 536, by a predetermined dimension so as to be recessed toward the inner wall 540. An elastically deformable cushioning material 556 such as flexible polyurethane foam is disposed between the recessed portion 554 and the upholstery material 552 so as to fill the recessed portion 554. The recessed portion 554 extends substantially horizontally along the upper end portion of the hold portion 536, namely along the opening portion 530 of the pocket shape, and extends to the lower end of the hold portion 536 so that the recessed portion 554 has an inverted L-shape in longitudinal section shown in FIG. 30. The cushioning material 556 is filled in so that the upholstery material 552 has such a curved shape that smoothly protrudes toward the interior side of the passenger compartment as shown in FIG. 30 when in a natural state and so that the upholstery material 552 has such an outer shape that is smoothly continuous with the outer peripheral edge portion of the recessed portion 554. The outer peripheral edge portion of the upholstery material 552 is wrapped around the outer peripheral edge of the base material 550 and fixed, so that the upholstery material 552 is under tension.

The base material 550 has the recessed portion 554 and the cushioning material 556 is filled in as described above. Accordingly, when the finger 534 is placed into the opening portion 530 and the upper end portion of the hold portion 536 is held between the finger 534 and the palm 538, the cushioning material 556 is compressed and recessed by a wrist-side portion of the palm 538 as shown in FIG. 31. The vehicle door 510 can be thus reliably held and gripped at the upper end portion of the hold portion 536 and can easily perform an operation of opening and closing the vehicle door 510. That is, the recessed portion 554 and the cushioning material 556 are intended to allow the vehicle door 510 to be reliably held at the upper end portion of the hold portion 536 as the wrist-side portion of the palm 538 is pressed into the recessed portion 554. The recessed portion 554 and the cushioning material 556 are disposed at the position lower than the upper end of the hold portion 536 by the predetermined dimension according to the grip shape of the hand 532.

In a part of the hold portion 536 which is located on the upper side of the vehicle with respect to the recessed portion 554, the upholstery material 552 is placed on top of the base material 550 so as to be in close contact therewith, the upholstery material 552 and the base material 550 are smoothly curved toward the inner side of the pocket shape as they extend to the upper side according to the grip shape of the hand 532, and abut on the upper end portion of the inner wall 540 so that this curved portion is held with the hand. The recessed portion 554 and the cushioning material 556 are formed so as to extend beyond the opening portion 530 toward the front side of the vehicle in the longitudinal direction of the vehicle. Accordingly, when holding the hold portion 536, the thumb projecting from the palm 538 toward the front side of the vehicle can also be pressed into the recessed portion 554 while compressing the cushioning material 556. The vehicle door 510 can be thus more easily and reliably held at the upper end portion of the hold portion 536 between the palm 538 and the finger 534.

As described above, in the pull handle portion 524 of the vehicle door 510 of the present embodiment, the base material 550 constituting the laminate material and forming the outer wall 542 of the hold portion 536 has the recessed portion 554, and the cushioning material 556 is disposed between the recessed portion 554 and the upholstery material 552 so as to fill the recessed portion 554. Accordingly, when placing the finger 534 into the opening portion 530 and holding the hold portion 536 between the finger 534 and the palm 538, the cushioning material 556 is compressed and recessed as shown in FIG. 31. The vehicle door 510 can be thus reliably held and gripped at the upper end portion of the hold portion 536 and can easily perform an operation of opening and closing the vehicle door 510. When the opening and closing operation is not performed, the upholstery material 552 protrudes due to the elasticity of the cushioning material 556 and has such an outer shape that is smoothly continuous with the portion other than the recessed portion 554. Accordingly, desired design can be ensured in spite of the improved grip performance due to the recessed portion 554.

The recessed portion 554 is formed so as to extend beyond the opening portion 530 toward the front side of the vehicle in the longitudinal direction of the vehicle. Accordingly, when holding the hold portion 536, the thumb projecting from the palm 538 toward the front side of the vehicle can also be pressed into the recessed portion 554 while compressing the cushioning material 556. The vehicle door 510 can be thus more easily and reliably held at the upper end portion of the hold portion 536 with the palm 538 and the finger 534.

In the part of the hold portion 536 which is located on the upper side of the vehicle with respect to the recessed portion 554, the upholstery material 552 is placed on top of the base material 550 so as to be in close contact therewith, and the upholstery material 552 and the base material 550 are smoothly curved toward the inner side of the pocket shape as they extend to the upper side, so that this curved portion is held with a hand. The hold portion 536 thus conforms to the grip shape of the hand 532 which is made at the time of holding an object, and the driver etc. can more easily hold the hold portion 536. Moreover, since the cushioning material 556 is not present in this part, the opening and closing operation force is directly transmitted to the vehicle door 510, and an opening and closing operation can be appropriately performed.

Although the embodiments of the present invention are described in detail above based on the drawings, these embodiments are shown by way of example only, and the present invention can be carried out in various modified or improved forms based on the knowledge of those skilled in the art.

REFERENCE SIGNS LIST

10: Vehicle interior part 16: Soft upholstery material 16a: Fold-back terminal portion 22: Base material 22a: Terminal portion 24: Terminal portion structure 30: Projecting rib 30a: Tilted surface 32: Engagement hole 34: Peripheral edge portion 36: Bent portion 214, 230: Vehicle interior panel 216: Upholstery material (Upholstery portion) 216a: Fold-back terminal portion 218: Cushioning material (Cushioning portion) 220, 232: Surface layer member 222: Base material (Base plate) 222a: Terminal portion 226: Inward flange portion 226a: Terminal 228: Clearance 234: Elastic projection (Cushioning portion) 310: Armrest (Vehicle composite interior part) 312: Base material (First member) 312a: Mating surface 312b: Back surface of the base material 314: Pull handle (Second member) 314a: Mating spurface 316: Soft surface layer member 316a: Edge portion of the soft surface layer member 318: Positioning projection 320: Positioning hole 322: Surface layer-side projecting portion (Tension force generating portion) 324: Pull handle-side projecting portion (Second member-side projecting portion, Tension force generating portion) 326: Stepped portion (Tension force generating portion) 328: Engagement hole (Tension force generating portion) 330: Engagement base (Tension force generating portion) 332: Engagement projection (Tension force generating portion) 334: Engagement hole (Tension force generating portion) 336: Engagement tilted surface (Tension force generating portion) 338: First engagement projection (Tension force generating portion) 340: Cutout 342: Second engagement projection (Tension force generating portion)

The invention claimed is:

1. A vehicle interior part including a structure in which a soft upholstery material covers a front surface of a base material which is located on an interior side of a vehicle,
the soft upholstery material being disposed in a stretched state on the front surface of the base material which is located on the interior side of the vehicle,
the vehicle interior part including a structure in which a projecting rib formed on a terminal portion of the base material so as to project in a plane direction of the base material is retained in an engagement hole formed in a fold-back terminal portion of the soft upholstery material,
an inward flange portion being formed at a position adjacent to the projecting rib on the terminal portion of the base material so as to project toward a design surface side,
the projecting rib having a tilted surface formed on the design surface side and tilted with respect to a direction in which the projecting rib projects so as to be continuous from a tip end surface of the inward flange portion to a tip end of the projecting rib such that the projecting rib becomes gradually thinner toward its tip end in the direction in which the projecting rib projects, and
the projecting rib projecting from a peripheral edge portion of the terminal portion of the base material at a position closer to a surface of the base material located on an opposite side from the design surface side, in a thickness direction of the terminal portion of the base material.

2. The vehicle interior part according to claim 1, wherein the engagement hole is formed in a bent portion of the fold-back terminal portion of the soft upholstery material at a position closer to a surface of the soft upholstery material located on the opposite side from the design surface side in a thickness direction of the fold-back terminal portion of the soft upholstery material.

3. A vehicle interior part including a structure in which a soft upholstery material covers a front surface of a base material which is located on an interior side of a vehicle, the soft upholstery material being disposed in a stretched state on the front surface of the base material which is located on the interior side of the vehicle, the vehicle interior part being a vehicle composite interior part including a first member which is the base material and a second member that are fitted on each other, and the soft upholstery material that is elastically deformable, that has the fold-back terminal portion and that partially or entirely covers a front surface of the first member with the fold-back terminal portion being held between a mating surface of the first member and a mating surface of the second member, and at least one of the soft upholstery material and the second member including a tensile force generating portion that, as the mating surfaces of the first and second members are moved toward each other, pulls the fold-back terminal portion of the soft upholstery material toward a back surface of the first member to apply a tensile force to the soft upholstery material.

4. The vehicle composite interior part according to claim 3, wherein the tensile force generating portion is a surface layer-side projecting portion that is formed in the fold-back terminal portion of the soft upholstery material at a position adjacent to the mating surface of the first member on a back surface side of the first member so as to project toward the second member and that is pressed toward the first member by the second member as the fold-back terminal portion is held between the mating surfaces of the first and second members.

5. The vehicle composite interior part according to claim 3, wherein the tensile force generating portion is a second member-side projecting portion that is formed on the second member at a position adjacent to the mating surface of the first member on the back surface side of the first member so as to project from the second member toward the first member and that presses the fold-back terminal portion of the soft upholstery material toward the first member along the back surface of the first member as the fold-back terminal portion is held between the mating surfaces of the first and second members.

6. The vehicle composite interior part according to claim 3, wherein the tensile force generating portion is a stepped portion that is formed in the second member at a position adjacent to the mating surface of the first member on the back surface side of the first member so as to project from the second member toward the first member and that presses the fold-back terminal portion of the soft upholstery material toward the first member along the back surface of the first member as tile fold-back terminal portion is held between the mating surfaces of the first and second members.

7. The vehicle composite interior part according to claim 3, wherein the tensile force generating portion includes an engagement hole formed in the fold-back terminal portion of the soft upholstery material at a position adjacent to the mating surface of the first member on the back surface side of the first member so as to extend through the fold-back terminal portion, an engagement base formed in the second member at a position on the first member side of the mating surface of the first member so as to be located inside the first member, and an engagement projection that projects from the engagement base toward the first member and that engages with the engagement hole and pulls the fold-back terminal portion of the soft upholstery material toward the back surface of the first member as the fold-back terminal portion is held between the mating surfaces of the first and second members.

8. The vehicle composite interior part according to claim 3, wherein the tensile force generating portion includes an engagement hole formed in the fold-back terminal portion of the soft upholstery material at a position corresponding to the mating surface of the first member so as to extend through the fold-back terminal portion, an engagement projection that projects from the mating surface of the second member toward the first member and that has an engagement tilted surface tilted toward an edge of the soft upholstery material as it extends to a distal end of the engagement projection, and a cutout that is formed in the mating surface of the first member and that avoids interference with the engagement projection.

* * * * *